United States Patent
Zolli et al.

(10) Patent No.: US 9,297,567 B2
(45) Date of Patent: Mar. 29, 2016

(54) CONDENSER ASSEMBLY WITH A FAN CONTROLLER AND A METHOD OF OPERATING SAME

(71) Applicant: National Refrigeration & Air Conditioning Canada Corp., Brantford (CA)

(72) Inventors: Vince Zolli, Brantford (CA); William J. Mead, Paris (CA)

(73) Assignee: National Refrigeration & Air Conditioning Canada Corp., Brantford, Ontario (CA)

( * ) Notice: Subject to any disclaimer, the term of this patent is extended or adjusted under 35 U.S.C. 154(b) by 0 days.

(21) Appl. No.: 14/604,106

(22) Filed: Jan. 23, 2015

(65) Prior Publication Data

US 2015/0128624 A1 May 14, 2015

Related U.S. Application Data

(63) Continuation-in-part of application No. 14/080,985, filed on Nov. 15, 2013, now Pat. No. 9,151,525, which is a continuation of application No. 12/696,465, filed on Jan. 29, 2010, now Pat. No. 8,635,883.

(60) Provisional application No. 61/148,451, filed on Jan. 30, 2009.

(51) Int. Cl.
*F25B 17/00* (2006.01)
*F25B 49/02* (2006.01)

(52) U.S. Cl.
CPC .............. *F25B 49/027* (2013.01); *F25B 49/02* (2013.01); *F25B 2400/01* (2013.01); *F25B 2600/0251* (2013.01); *F25B 2600/111* (2013.01); *F25B 2600/112* (2013.01); *F25B 2700/2106* (2013.01); *Y02B 30/743* (2013.01)

(58) Field of Classification Search
CPC .... F25B 49/027; F25B 29/02; F25B 2400/01; F25B 2600/0251; F25B 2600/111; F25B 2600/112; F25B 2700/2106; Y02B 30/743
See application file for complete search history.

(56) References Cited

U.S. PATENT DOCUMENTS

| | | | |
|---|---|---|---|
| 2,049,329 A | 7/1936 | Smith | |
| 2,253,657 A | 8/1941 | Smith | |
| 2,952,991 A | 9/1960 | Pierre | |
| 3,299,650 A | 1/1967 | Kramer | |
| 3,354,665 A | 11/1967 | Lewis | |
| 3,877,243 A | 4/1975 | Kramer | |
| 3,922,874 A | 12/1975 | Canter | |

(Continued)

*Primary Examiner* — Jonathan Bradford
*Assistant Examiner* — Elizabeth Martin

(57) ABSTRACT

A condenser assembly through which a refrigerant is circulated to transfer heat from the refrigerant to ambient air in which the condenser assembly is at least partially disposed. The condenser assembly includes a compressor, a crankcase heater energizable via a crankcase heater control circuit, a condenser, a condenser fan, and an electronically commutated condenser fan motor. The condenser assembly also includes an ambient temperature sensor for sensing at least one temperature of the ambient air, to provide a sensed temperature. The condenser assembly includes a condenser switch subassembly configured to control energization of the crankcase heater and the condenser fan motor. The condenser switch subassembly is controlled by the ambient temperature sensor. The condenser fan motor is controlled by a condenser fan controller that applies a first voltage or a second voltage to the condenser fan motor depending on whether a third conductor attached to the motor is energized.

12 Claims, 14 Drawing Sheets

(56) References Cited

U.S. PATENT DOCUMENTS

| | | | |
|---|---|---|---|
| 3,958,429 A | 5/1976 | Kirsch | |
| 3,959,979 A * | 6/1976 | Kramer | F25B 39/04 |
| | | | 165/299 |
| 4,007,605 A | 2/1977 | Denny | |
| 4,049,044 A | 9/1977 | Cohen | |
| 4,075,865 A | 2/1978 | Wills | |
| 4,120,173 A | 10/1978 | Kimpel | |
| 4,137,057 A | 1/1979 | Piet et al. | |
| 4,167,966 A | 9/1979 | Freeman | |
| 5,138,844 A | 8/1992 | Clanin et al. | |
| 5,144,812 A * | 9/1992 | Mills, Jr. | F24F 1/06 |
| | | | 62/186 |
| 5,150,581 A | 9/1992 | Smith | |
| 5,247,805 A | 9/1993 | Dennis | |
| 5,333,469 A | 8/1994 | Hullar et al. | |
| 5,435,148 A | 7/1995 | Sandofsky et al. | |
| 5,477,699 A | 12/1995 | Guess et al. | |
| 5,630,323 A | 5/1997 | Niijima et al. | |
| 5,797,276 A | 8/1998 | Howenstine et al. | |
| 5,983,653 A | 11/1999 | Lee | |
| 6,014,325 A | 1/2000 | Pecore | |
| 6,397,612 B1 | 6/2002 | Kernkamp et al. | |
| 6,594,554 B1 | 7/2003 | Seem et al. | |
| 7,151,349 B1 | 12/2006 | Williamson et al. | |
| 7,246,500 B2 | 7/2007 | Singh et al. | |
| 7,275,387 B2 | 10/2007 | Gist et al. | |
| 7,340,907 B2 | 3/2008 | Vogh, III | |
| 7,559,207 B2 | 7/2009 | Knight et al. | |
| 7,845,183 B2 | 12/2010 | Singh et al. | |
| 8,051,668 B2 | 11/2011 | Singh et al. | |
| 8,327,656 B2 | 12/2012 | Tutunoglu et al. | |
| 8,635,883 B2 | 1/2014 | Zolli et al. | |
| 2006/0288713 A1 | 12/2006 | Knight et al. | |
| 2007/0256437 A1 | 11/2007 | Singh et al. | |
| 2008/0083237 A1 | 4/2008 | Street et al. | |
| 2011/0167846 A1 | 7/2011 | Knight et al. | |
| 2013/0139529 A1 | 6/2013 | Lu et al. | |
| 2014/0075971 A1 | 3/2014 | Zolli et al. | |

* cited by examiner

CONDENSER ASSEMBLY WITH A FAN CONTROLLER AND A METHOD OF OPERATING SAME

This application is a continuation-in-part of U.S. patent application Ser. No. 14/080,985, filed on Nov. 15, 2013, which is a continuation of U.S. patent application Ser. No. 12/696,465, filed Jan. 29, 2010, now U.S. Pat. No. 8,635,883, and claims the benefit of U.S. Provisional Application No. 61/148,451, filed Jan. 30, 2009, each of which prior application is hereby incorporated herein by reference.

FIELD OF THE INVENTION

The present invention is a condenser assembly with a fan controller and a method of operating same.

BACKGROUND OF THE INVENTION

As is well known in the art, in a refrigeration unit utilizing the vapor compression cycle, a compressor circulates a refrigerant from an evaporator through a condenser and an expansion valve and back to the evaporator. The refrigeration unit also includes a housing defining a volume of air in which the temperature is to be controlled. For example, walk-in housings for commercial applications are well known in the art. The refrigeration unit may be a cooler or a freezer.

The evaporator typically is included in an evaporator assembly, which includes one or more fans which are rotated to circulate air in the housing, and in particular, to move air through the evaporator. Typically, the refrigeration unit includes a thermostat positioned in the housing for regulating the temperature of the air inside the housing within a desired range of temperatures. As is well known in the art, the thermostat generates signals which cause activation or de-activation of the compressor, as required to maintain the temperature of the air in the housing within the desired range. However, in the prior art, the fans typically are rotated at a substantially constant speed, regardless of whether the compressor is activated.

In the prior art, the thermostat often controls the operation of the compressor via a liquid line solenoid (i.e., a solenoid valve subassembly), which controls the flow of the refrigerant into the evaporator. A typical solenoid control circuit 44 is schematically illustrated in FIG. 1A. (As will be described, the remainder of the drawings illustrate the present invention.) As shown in FIG. 1A, in the prior art, a fan control circuit 52 and the solenoid control circuit 44 are not operably connected.

For example, a typical prior art solenoid control circuit 44 includes two wires (identified as L1 and L2, which may be a live and a neutral conductor), and a thermostat 30 which completes the solenoid control circuit 44 when the temperature of the air in the housing (not shown) is above a predetermined cut-in temperature, as is known. Upon its energization, the solenoid valve included in the solenoid valve subassembly opens, and while energized the valve remains open, permitting the refrigerant to circulate. As is well known in the art, after the refrigerant passes through the evaporator, the refrigerant is drawn back to the compressor.

Once a predetermined cut-out temperature is reached, the thermostat 30 opens the solenoid control circuit. Upon its de-energization, the solenoid closes, preventing circulation of the refrigerant. The refrigerant which is in the evaporator when the solenoid closes is drawn out of the evaporator by the compressor, i.e., the compressor continues to operate for a limited time. Once substantially all the refrigerant has been removed from the evaporator, a pressure switch opens an electrical circuit (not shown) to the compressor, and the compressor is de-activated, as is known. While the compressor is de-activated, the temperature of the air in the housing gradually increases, due to transfer of heat from outside the housing to its interior.

A typical evaporator assembly includes a number of fans driven by a number of electric fan motors respectively. However, it will be understood that, to simplify the description herein, reference is generally made to an evaporator assembly including a single fan motor rotating a fan.

The prior art fan control circuit 52 includes only first and second conductors L1, L2, i.e., a fan motor 21 operates when there is a sufficient predetermined voltage between the first and second conductors. While the prior art fan motor is energized, it operates at a substantially constant speed, because there is a substantially constant voltage provided between the first and second conductors while the prior art refrigeration unit operates, i.e., regardless of whether the compressor is activated. As noted above and as schematically represented in FIG. 1A, the prior art fan control circuit 52 (which controls one or more fan motors 21) is independent of the prior art solenoid control circuit 44.

As is known, the electrical power supplied may be 230V or 120V. If 120V power is provided, then L1 and L2 are live and neutral conductors respectively. If 230V power is provided, then L1 and L2 are both considered live. Accordingly, for the purposes hereof, L1 and L2 are referred to generically hereinafter as a "first" and a "second" conductor respectively.

In the prior art and as described above, the fans in the evaporator assembly typically are rotated at a substantially constant speed, regardless of whether the compressor is operating or not. This is done because some air circulation in the housing while the compressor is de-activated is desirable, to maintain a substantially uniform air temperature inside the housing (i.e., while the air temperature inside the housing gradually increases over time).

Also, in a cooler, when the compressor is de-activated (i.e., the thermostat has cycled off), air circulation melts frost on the fins in the evaporator, i.e., the air circulation serves to defrost the refrigeration unit.

However, it appears that the benefits of air circulation while the compressor is de-activated would be available if the fans rotated at reduced speed(s). Accordingly, operating the fans in the evaporator assembly at a substantially constant speed is wasteful, to the extent that more energy is consumed in rotating the fans than is necessary to achieve the benefits of air circulation within the housing.

A condenser subsystem 18 of the prior art is schematically illustrated in FIG. 1B. Typically, the condenser subsystem 18 includes a compressor 12 and a condenser 13. As is well known in the art, the condenser subsystem 18 typically also includes a crankcase heater 28, heating the compressor 12, i.e., in cold weather. The condenser subsystem 18 typically also includes a condenser fan 36 driven by a condenser fan motor 38.

In many installations, e.g., commercial and industrial refrigeration facilities, the condenser subsystem 18 may be at least partially disposed in ambient air (i.e., outdoors, in the atmosphere), or at least is in fluid communication with the ambient outdoor air, to facilitate dispersal of heat from the refrigerant passing through the condenser 13 to the ambient air. The crankcase heater 28 is thought to be needed in order for the compressor 12 to operate properly when the ambient air temperature is relatively low, e.g., approximately 10° C. or less. As is well known in the art, the supply of electrical energy to the crankcase heater 28 preferably is controlled by a crankcase heater thermostat or crankcase heater controller 40 based on a sensed temperature of the ambient air, as sensed by an ambient temperature sensor. For example, as is well known in the art, the temperature sensor may be a bimetallic strip built into the switch that causes the prior art switch to close if the ambient temperature is below a preselected temperature. Alternatively, however, the ambient temperature sensor may have any other suitable form, e.g., the ambient temperature sensor may be an electronic device. In this type of installation, the crankcase heater 28 is energized when the ambient air temperature is below the preselected temperature, as illustrated in FIG. 1B.

As noted above, when the refrigerant is directed through the condenser, heat is dispersed from the refrigerant to the ambient air. The flow of the ambient air over and/or through the condenser that results from rotation of the condenser fan causes more heat to be dispersed to the ambient air. When the ambient air is relatively cold, more heat is dispersed, due to the ambient air's low temperature. In the prior art, however, the condenser fan motor 38 typically is operated at a relatively high rate of rotation when the refrigeration unit is operating, regardless of the temperature of the ambient air. Accordingly, operating the condenser fan at the high rate of rotation regardless of the ambient air temperature is, to an extent, a waste of energy, because the fan could be operated at a lower speed when the ambient air temperature is low without significantly adversely affecting the operation of the condenser.

SUMMARY OF THE INVENTION

There is a need for a condenser assembly with a fan controller and a method of operating same that overcomes or mitigates one or more of the disadvantages or defects of the prior art. Such disadvantages or defects are not necessarily included in those noted above.

In its broad aspect, the invention provides a condenser assembly through which a refrigerant is circulated to transfer heat from the refrigerant to ambient air in which the condenser assembly is at least partially disposed. The condenser assembly includes a compressor, for compressing and superheating the refrigerant, a crankcase heater for heating the compressor, the crankcase heater being energizable via a crankcase heater control circuit, and a condenser in fluid communication with the compressor in which the refrigerant is received after exiting the compressor. The condenser assembly also includes one or more condenser fans, for moving the ambient air past the condenser to transfer heat from the refrigerant in the condenser to the ambient air, and one or more electronically commutated condenser fan motors for rotating the condenser fan(s). The condenser fan motor is energizable via a condenser fan control circuit selected from the group consisting of a first condenser fan control circuit and a second condenser fan control circuit that includes a third conductor, or third wire. In addition, the condenser assembly includes a condenser switch subassembly configured to control energization of the crankcase heater and said at least one condenser fan motor, the condenser switch subassembly being switchable between: a first condition, in which the crankcase heater control circuit is closed and energizable, and the second condenser fan control circuit is open and non-energizable; and a second condition, in which the crankcase heater control circuit is open and non-energizable, and the second condenser fan control circuit is closed and energizable. Additionally, the condenser assembly includes an ambient temperature sensor for sensing one or more temperatures of the ambient air, to provide a sensed temperature. The condenser switch subassembly includes a single pole double throw switch controlled by the ambient temperature sensor so that, when the sensed temperature is equal to or less than a predetermined cut-in temperature, the condenser switch subassembly is in the first condition, and when the sensed temperature is greater than the predetermined cut-in temperature, the condenser switch subassembly is in the second condition. The condenser assembly also includes a condenser fan controller configured to detect energization of the third conductor, to apply a first voltage to the condenser fan motor when energization of the third wire is not detected thereby, and to apply a second voltage to the condenser fan motor when energization of the third wire is detected thereby, the second voltage being greater than the first voltage.

In another aspect, the invention provides a refrigeration system in which a refrigerant is circulatable to transfer heat out of a volume of air in a housing. The refrigeration system includes an evaporator assembly through which the refrigerant is circulatable for heat transfer from the air in the housing to the refrigerant, the evaporator assembly including an evaporator through which the refrigerant is directed, for heat transfer from the air to the refrigerant. The refrigeration system also includes a condenser assembly through which the refrigerant is circulatable for heat transfer from the refrigerant to ambient air in which the condenser assembly is at least partially disposed, the condenser assembly includes a compressor through which the refrigerant received from the evaporator is circulatable, for compressing and superheating the refrigerant, a crankcase heater for heating the compressor, the crankcase heater being energizable via a crankcase heater control circuit, a condenser in fluid communication with the compressor in which the refrigerant is received after exiting the compressor, one or more condenser fans, for moving the ambient air past the condenser to transfer heat from the refrigerant in the condenser to the ambient air, and one or more electronically commutated condenser fan motors for rotating the condenser fan, the condenser fan motor being energizable via a condenser fan control circuit selected from the group consisting of a first condenser fan control circuit and a second condenser fan control circuit that includes a third conductor. In addition, the condenser assembly includes a condenser switch subassembly configured to control energization of the crankcase heater and the condenser fan motor. The condenser switch subassembly is switchable between: a first condition, in which the crankcase heater control circuit is closed, and the second condenser fan control circuit is open; and a second condition, in which the crankcase heater control circuit is open, and the second condenser fan control circuit is closed. The condenser assembly also includes an ambient temperature sensor for sensing one or more temperatures of the ambient air, to provide a sensed temperature. The condenser switch subassembly including a single pole double throw switch controlled by the ambient temperature sensor so that, when the sensed temperature is equal to or less than a predetermined cut-in temperature, the condenser switch subassembly is in the first condition, and when the sensed temperature is greater than the predetermined cut-in temperature, the condenser switch subassembly is in the second condition. Also, the condenser assembly includes a condenser fan controller configured to detect energization of the third conductor, to apply a first voltage to the condenser fan motor when energization of the third wire is not detected thereby, and to apply a second voltage to the condenser fan motor when energization of the third wire is detected thereby. The second voltage is greater than the first voltage.

In yet another of its aspects, the invention provides a method of operating a condenser assembly through which a refrigerant is circulatable to transfer heat from the refrigerant to ambient air in which the condenser assembly is at least partially disposed. The method includes compressing the refrigerant in a compressor through which the refrigerant is circulatable, providing a crankcase heater to heat the compressor, the crankcase heater being energizable via a crankcase heater control circuit, and providing a condenser in fluid communication with the compressor, in which the refrigerant exiting the compressor is received. A condenser fan is also provided, for moving the ambient air past the condenser to transfer heat from the refrigerant in the condenser to the ambient air, and one or more electronically commutated condenser fan motors are also provided, for rotating the condenser fan(s). The condenser fan motor is energizable via a condenser fan control circuit selected from the group consisting of a first condenser fan control circuit and a second condenser fan control circuit that includes a third conductor. A condenser switch subassembly configured to control energization of the crankcase heater and said at least one condenser fan motor is also provided, the condenser switch subassembly being switchable between: a first condition, in which the crankcase heater control circuit is closed, and the second condenser fan control circuit is open; and a second condition, in which the crankcase heater control circuit is open, and the second condenser fan control circuit is closed. In addition, an ambient temperature sensor is provided, for sensing at least one temperature of the ambient air, to provide a sensed temperature. A single pole double throw switch is included in the condenser switch subassembly. The single pole double throw switch is controlled by the ambient temperature sensor so that, when the sensed temperature is equal to or less than a predetermined cut-in temperature, the condenser switch subassembly is in the first condition, and when the sensed temperature is greater than the predetermined cut-in temperature, the condenser switch subassembly is in the second condition. A condenser fan controller is provided that is configured to detect energization of the third wire, to apply a first voltage to the condenser fan motor when energization of the third conductor is not detected thereby, and to apply a second voltage to the condenser fan motor when the third conductor is energized. The second voltage is greater than the first voltage. Electrical energy is provided to the condenser assembly so that, when the condenser switch subassembly is in the first condition, the crankcase heater control circuit is energized and the condenser fan controller applies the first voltage to the condenser fan motor, and when the condenser switch subassembly is in the second condition, the third conductor is energized and the condenser fan controller applies the second voltage to the condenser fan motor.

Using the ambient temperature sensor, the temperature of the ambient air is sensed. If the sensed temperature is equal to or below the predetermined condenser control cut-in temperature, then the ambient temperature sensor causes the condenser switch subassembly to be in the first condition. If the sensed temperature is greater than the condenser control cut-in temperature, then the condenser switch subassembly is in the second condition.

BRIEF DESCRIPTION OF THE DRAWINGS

The invention will be better understood with reference to the drawings, in which.

DETAILED DESCRIPTION

Figure 1A:
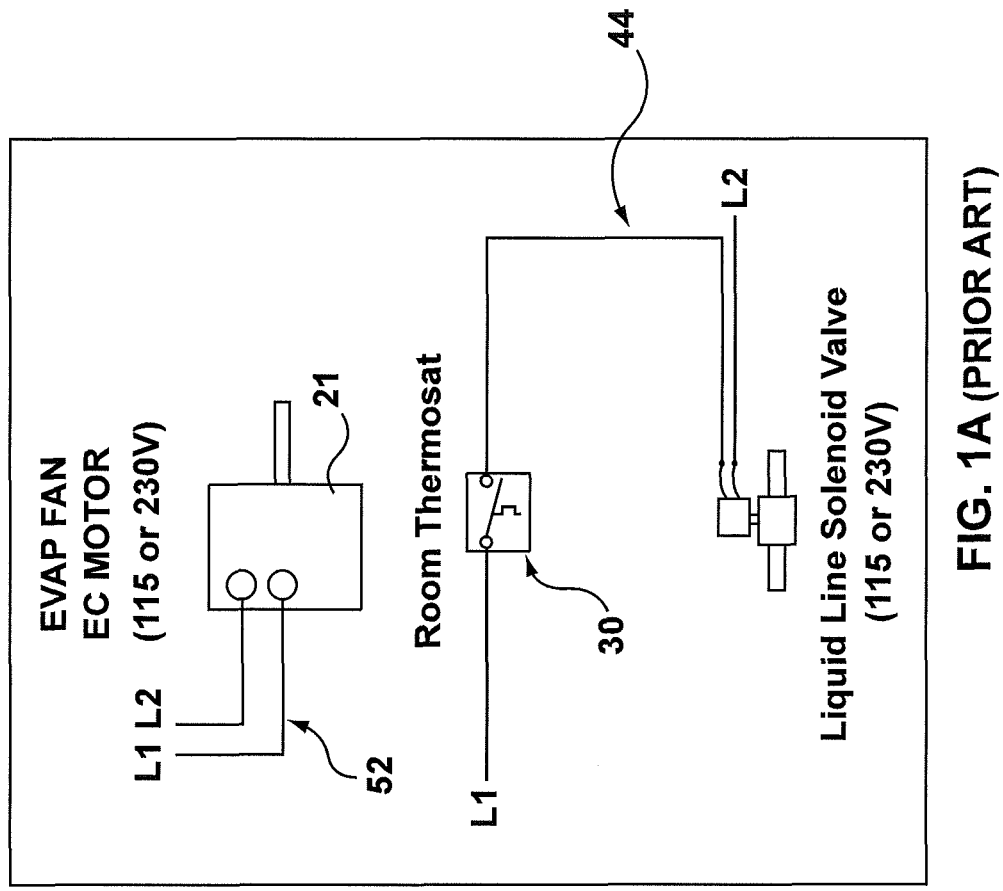
FIG. 1A (also described previously) is a schematic diagram illustrating an evaporator fan control circuit of the prior art.

To simplify the description of the invention, the reference numerals used previously in FIGS. 1A and 1B are used again below, except that each such reference numeral is raised by 100 (or multiples thereof, as the case may be), where the parts described correspond generally to parts already described.

Figure 2A:
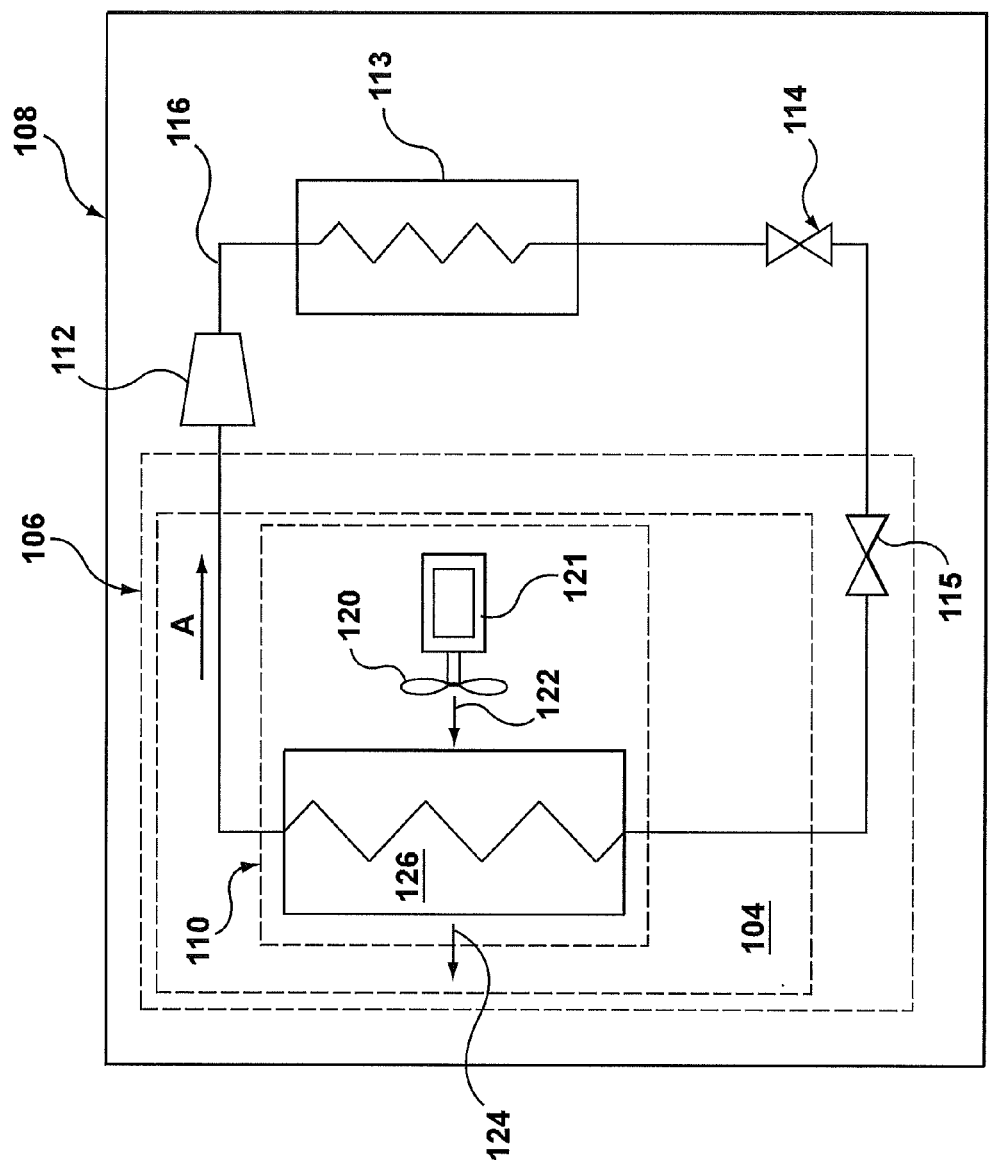
FIG. 2A is a schematic diagram illustrating an embodiment of a refrigeration unit of the present invention.
Figure 2B:
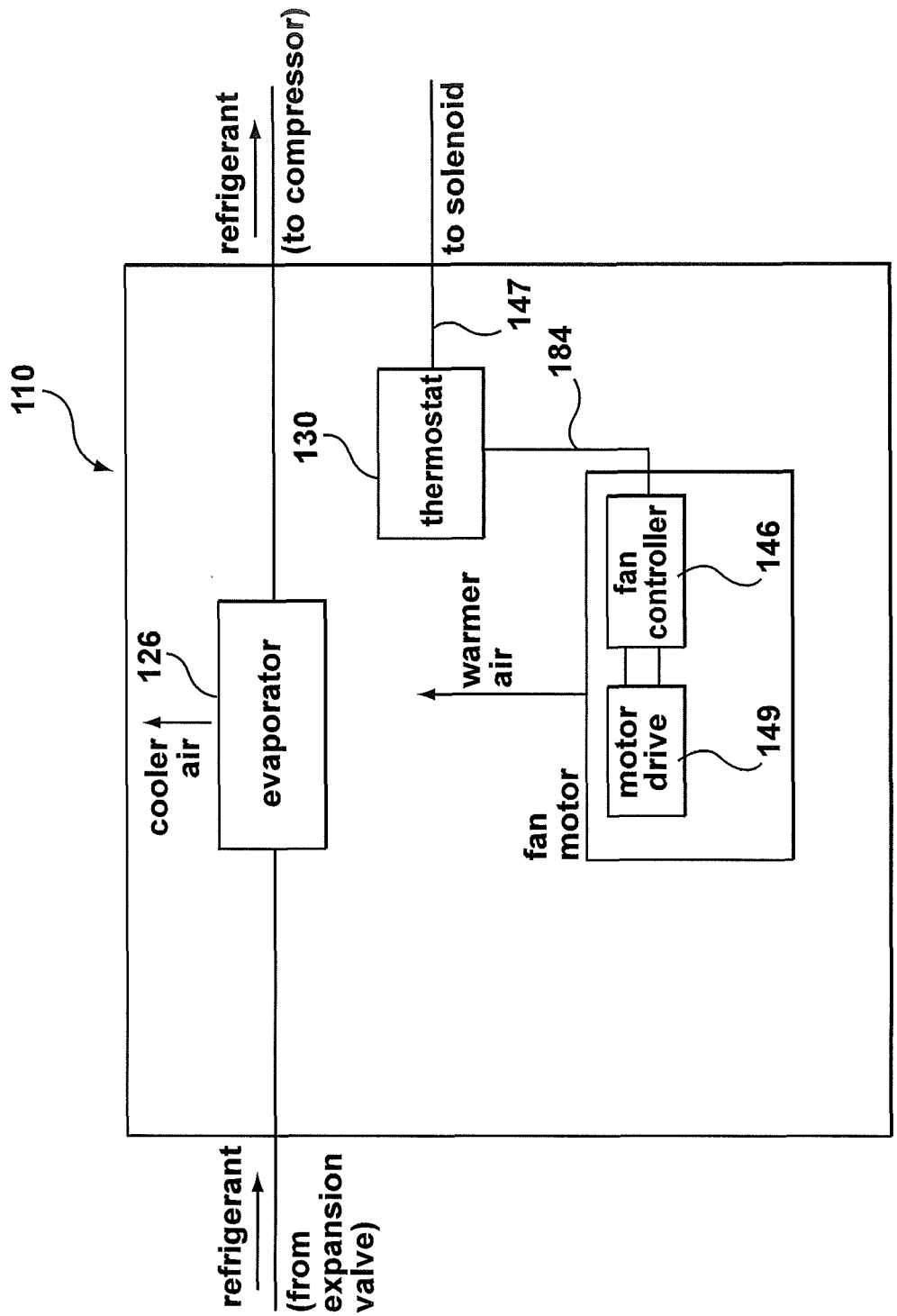
FIG. 2B is a schematic diagram illustrating an embodiment of an evaporator assembly of the invention.
Figure 3B:
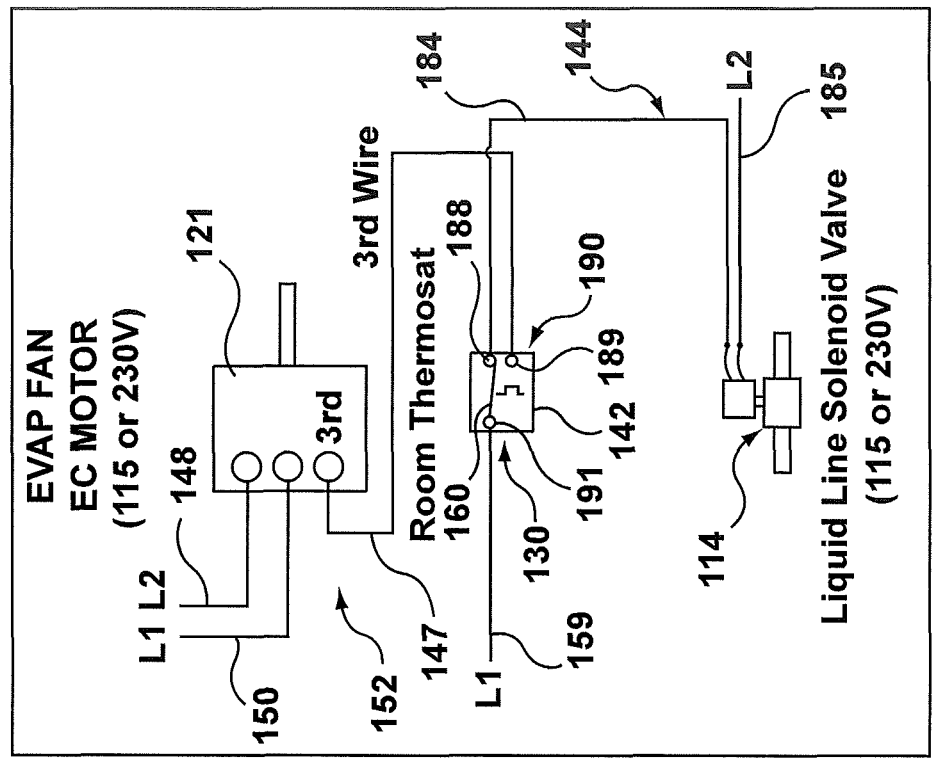
FIG. 3B is a schematic diagram illustrating embodiments of control circuits of the invention, in which the solenoid control circuit is completed.
Figure 3A:
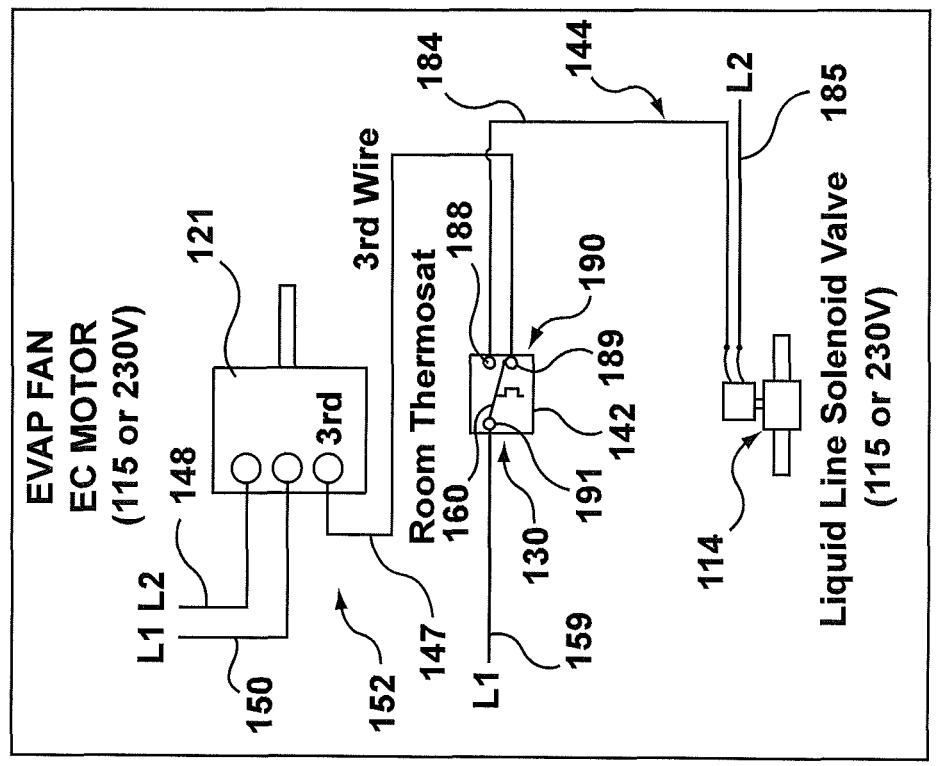
FIG. 3A is a schematic diagram illustrating embodiments of control circuits of the invention, in which a solenoid control circuit is opened.

Reference is first made to FIGS. 2A, 2B, 3A, and 3B to describe an embodiment of an evaporator assembly 110 of the invention. The evaporator assembly 110 (FIG. 2B) is adapted for flow of a refrigerant (not shown) therethrough to transfer heat out of a volume of air 104 in a housing 106 in which the evaporator assembly 110 is at least partially disposed (FIG. 2A). In one embodiment, the evaporator assembly 110 preferably includes an evaporator 126 in fluid communication with a compressor 112 for compressing the refrigerant (FIG. 2A). As is schematically shown in FIG. 2A, the circulation of the refrigerant preferably is controlled by a liquid line solenoid valve subassembly 114 which is switchable between an open condition, in which the refrigerant is circulatable, and a closed condition, in which the refrigerant is substantially non-circulatable. As will be described, the evaporator assembly 110 also includes a thermostat 130 (FIGS. 2B, 3A, 3B) which is electrically connectable to the solenoid valve subassembly 114 via a solenoid control circuit 144 (FIGS. 3A, 3B). Preferably, the thermostat 130 is adapted, or set, to complete the solenoid control circuit 144 when the temperature of the air in the housing is above a cut-in temperature, and to open the solenoid control circuit 144 when the temperature of the air in the housing is below a cut-out temperature. The solenoid valve subassembly 114 preferably is defaulted to be in the closed condition when the solenoid control circuit 144 is not energized. Preferably, the thermostat 130 includes a switch 142 for completing the solenoid control circuit 144 which allows current to flow through the thermostat 130 to the solenoid valve subassembly 114, to energize the solenoid, switching the solenoid valve subassembly 114 to the open condition.

The evaporator assembly 110 of the present invention preferably also includes one or more fans 120 (FIG. 2A) for circulating the air in the housing, and one or more fan motors 121 for rotating the fans. As will be appreciated by those skilled in the art, a supply voltage is supplied to the fan motor 121 across the first and second conductors. Each fan motor 121 is operable when a drive voltage is provided thereto across a first conductor 150 and a second conductor 148 connected thereto (FIGS. 3A, 3B). The fan motor 121 preferably is an EC (electronically commutated) motor. The EC motor 121 includes a fan controller 146 for controlling the drive voltage provided to a motor drive 149 of the fan motor 121 (FIG. 2B). The drive voltage provided to the motor drive 149 has a direct relationship to the speed at which the fan on the fan motor rotates. (It will be understood that elements of the evaporator assembly 110 of the invention are omitted from FIG. 2B for clarity of illustration.)

Typically, AC power is provided via the first and second conductors. The supply voltage (AC) across the first and second conductors 148, 150 is substantially constant. The AC voltage is converted to DC drive voltage by the fan controller 146 in the conventional manner, and the fan controller feeds the motor drive 149 in the fan motor 121.

As shown in FIGS. 3A and 3B, the thermostat 130 preferably is also electrically connectable to the fan controller 146 via a fan control circuit 152. The fan control circuit 152 includes a third wire 147 and the first conductor 150 (L1). As will be described, the thermostat 130 is adapted to complete the fan control circuit 152 upon opening the solenoid control circuit 144, and to open the fan control circuit 152 upon completing the solenoid control circuit 144. When the fan control circuit is closed, the signal voltage is across the third wire 147 and the first conductor 150. The controller 146 is adapted to sense either (i) a signal voltage (i.e., 120V or 230V, as required) across the third wire 147 and the first conductor 150, or (ii) a lack of voltage across those two conductors.

Preferably, the fan controller 146 is also programmed to provide one of two possible drive voltages (DC) to the motor drive 149. In particular, the controller 146 preferably is adapted to provide a first predetermined drive voltage to the motor drive 149 upon the fan controller detecting the signal voltage. It is preferred that the fan controller 146 is adapted to provide a second predetermined drive voltage to the motor drive 149 upon the fan controller failing to detect the signal voltage.

From the foregoing, it can be seen that, when the fan control circuit 152 is open, the controller 146 senses no voltage present across the third wire 147 and the first conductor 150. Upon the controller 146 failing to detect the signal voltage, in accordance with its programming, the fan controller 146 provides the second predetermined drive voltage to the motor drive 149.

As noted above, when the fan control circuit 152 is completed, the controller 146 senses the signal voltage (120V or 230V) between the third wire 147 and the first conductor 150. Upon the controller 146 detecting the signal voltage, the controller 146 decreases the drive voltage provided to the motor drive 149 to the first predetermined drive voltage.

In accordance with the foregoing, the fan motor 121 operates at different speeds due to the different drive voltages provided to the motor drive 149 respectively. The drive voltage which is provided to the motor drive 149 is determined by whether the fan controller 146 detects the signal voltage or not. The second predetermined drive voltage is greater than the first predetermined drive voltage. The result is that the fans are rotated at a lower speed when the solenoid control circuit 144 is open, and at a higher speed when the solenoid control circuit is closed.

The solenoid control circuit 144 preferably includes a first conductor 184 and a second conductor 185 (FIGS. 3A, 3B). When the solenoid control circuit 144 is closed, the single wire 159 and the first conductor 184 are electrically connected (FIG. 3B). When the solenoid control circuit 144 is closed, a voltage (e.g., 120V or 230V) preferably is applied across the single wire 159 and a second conductor 185, to energize the solenoid valve subassembly 114.

Those skilled in the art will appreciate that the switch 142 may be any suitable switch device. As shown in FIGS. 3A and 3B, in one embodiment, the switch 142 preferably is a single pole double throw switch. The switch 142 includes a contact 160 in the switch electrically connectable to the first conductor 184 at a first contact point 188 (i.e., to close the solenoid control circuit, and to open the fan control circuit) and, alternatively, electrically connectable to the third wire 147 at a second contact point 189 (i.e., to close the fan control circuit, and to open the solenoid control circuit).

The switch 142 preferably is also connected to a single wire 159 (L1) at a third contact point 191 (FIGS. 3A, 3B). Preferably, the third wire 147 connects the single wire 159 and the fan controller 146 when the fan control circuit 152 is closed (FIG. 3B).

As in a conventional solenoid valve, the solenoid valve subassembly 114 includes a plunger adapted to fit in a seat opening and a solenoid for moving the plunger into engagement with and off the seat (not shown). The plug or gate is movable between an open position, in which the refrigerant is circulatable, and a closed position, in which the refrigerant is substantially non-circulatable. When the plug or gate is in the open position, the solenoid valve subassembly is in the open condition, and when the plug or gate is in the closed position, the solenoid valve subassembly is in the closed condition. Because the operation and elements of the solenoid valve subassembly 114 are conventional, further description thereof is unnecessary.

Preferably, the evaporator assembly 110 is included in a refrigeration unit 108 of the invention (FIG. 2A). As noted above, the refrigeration unit 108 may be, for example, a cooler or a freezer, and the refrigeration unit is adapted to cool the volume of air 104 in the housing 106 (FIG. 2A). The cut-in temperature is higher than the cut-out temperature.

In one embodiment, the present invention is included in a refrigeration unit 108 employing the vapor compression cycle to transfer heat out of the volume of air in the housing. In the refrigeration unit 108 of the present invention, the refrigerant is circulated within the line 116 in the direction of arrow "A" when the liquid line solenoid valve subassembly 114 is in the open condition (FIG. 2A), from the evaporator 126 to a compressor 112, a condenser 113, the solenoid valve 114, an expansion valve 115, and back to the evaporator 126. Inside the housing 106, the fan(s) 120 rotated by the fan motor(s) 121 cause warmer air to be moved through (or over) the evaporator 126 (as indicated by arrow 122), so that heat therein is transferred from the air to the refrigerant in the evaporator 126, and air exiting the evaporator 126 (as indicated at arrow 124) is cooler, as in a conventional evaporator (FIG. 2A).

In use, cut-in and cut-out temperatures are entered into the thermostat 130. It will be appreciated that a desired set temperature may be entered into the thermostat 130 manually, programmatically, or in any other suitable fashion, as is conventional. The desired cut-in and cut-out temperatures depend on a variety of factors, such as but not limited to, the volume capacity of the housing, and the amount and type of materials to be stored within the housing. As an example, a restaurant may employ the evaporator assembly 110 of the present invention to keep meat products (not shown) stored in the housing frozen below a specific set temperature. It will be apparent that, for health and other reasons, the meat products of the above example must be kept at or below the set temperature at all times when the meat products are located within the housing. When the air within the housing is above the desired set temperature, the evaporator assembly 110 is adapted to be in cooling mode, meaning that the refrigerant is allowed to circulate through the solenoid valve subassembly 114, and through the evaporator 126 in the direction of arrow "A" (FIG. 2A). When the evaporator assembly 110 is operating in cooling mode, the fan motor 121 rotates at a faster speed than when the evaporator assembly 110 is operating in circulation mode. The thermostat 130 is operable to monitor continually the temperature of the air within the housing, in the conventional manner.

Also, when the air within the housing is above the cut-in temperature, the thermostat switch 142 is closed, which completes the solenoid control circuit 144. The controller 146 senses no voltage between the third wire 147 and the first conductor 150 (L1), and causes the higher predetermined voltage (i.e., the second predetermined voltage) to be provided to the motor drive. When the fan motor 121 is operating at the higher speed, the motor is rotating at the speed required for cooling mode.

From the foregoing, it can be seen that the invention provides a simple means for reducing energy consumption. The invention involves only a third wire and, preferably, a simple single pole double throw switch, which are positionable in the evaporator assembly. There is no requirement to add other, more costly elements, e.g., a third controller.

Those skilled in the art will appreciate that in one embodiment, the invention may be used to modify an existing refrigeration system. For example, in another embodiment, the invention preferably includes a kit of parts 190 including the third wire 147 and the switch 142, which preferably is included in the thermostat 130 (FIGS. 3A, 3B). As shown in FIGS. 3A and 3B, the third wire 147 preferably is connected to the switch 142 at the second contact point 189. The third wire 147 preferably is also connected to the fan motor 121. In addition, the first conductor 184 is connected to the switch 142 (of the thermostat 130) at the first contact point 188 therein (FIGS. 3A, 3B).

Figure 1B:
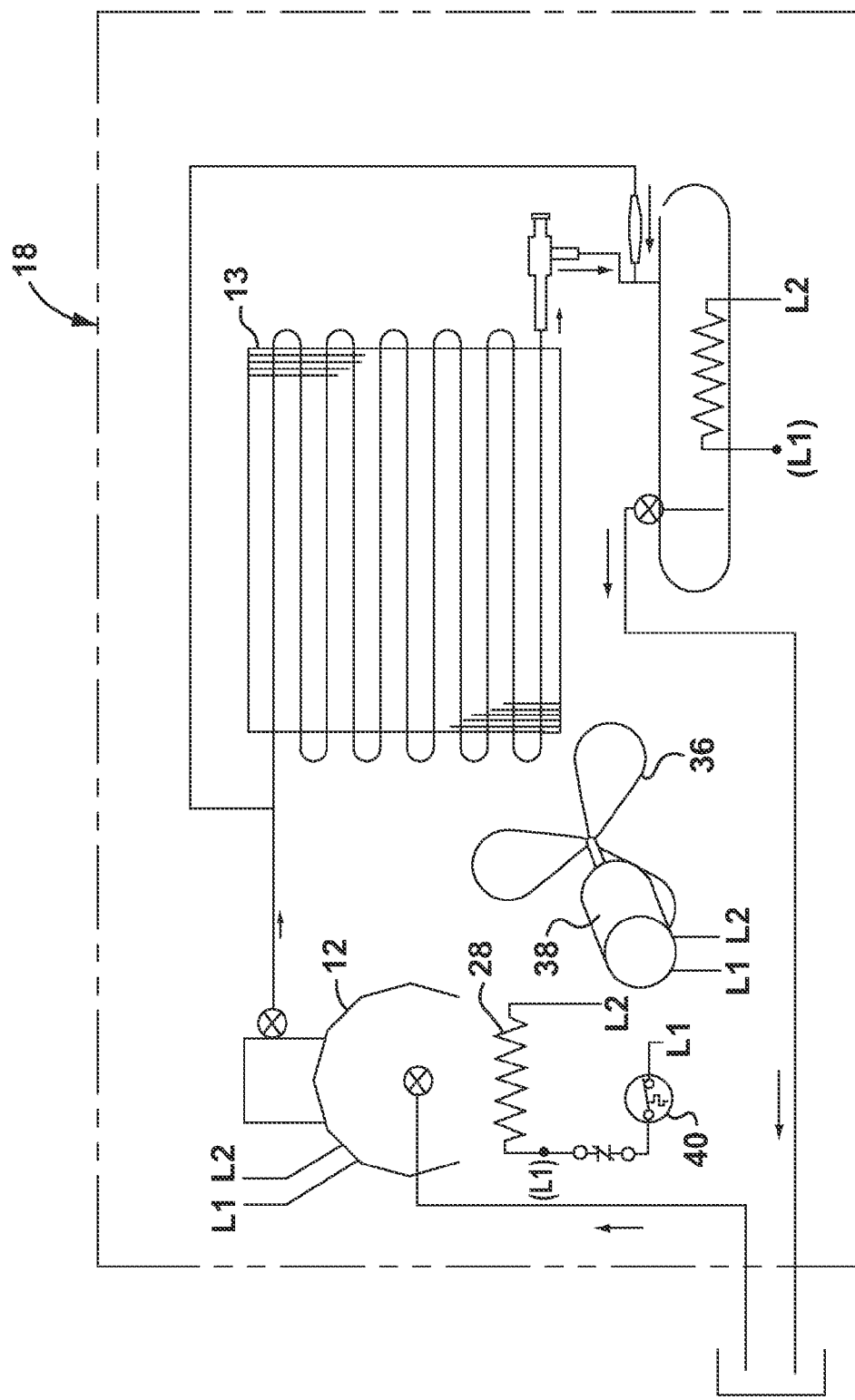
FIG. 1B (also described previously) is a schematic diagram illustrating a condenser subsystem of the prior art.

As can be seen in comparing the schematic diagrams of the prior art arrangement in FIG. 1A and the invention in FIGS. 3A and 3B, upon installation of the kit 190 of the invention, the switch 42 of the prior art thermostat is replaced by the switch 142 (e.g., a single pole double-throw switch) of the thermostat 130 of the invention. Also, the fan motor 121 (i.e., the fan controller 146 thereof) and the thermostat 130 are connectable via the third wire 147. Accordingly, those skilled in the art will appreciate that the kit 190 can be installed in an existing refrigeration system relatively easily, at minimal expense and without extensive downtime.

Figure 4:
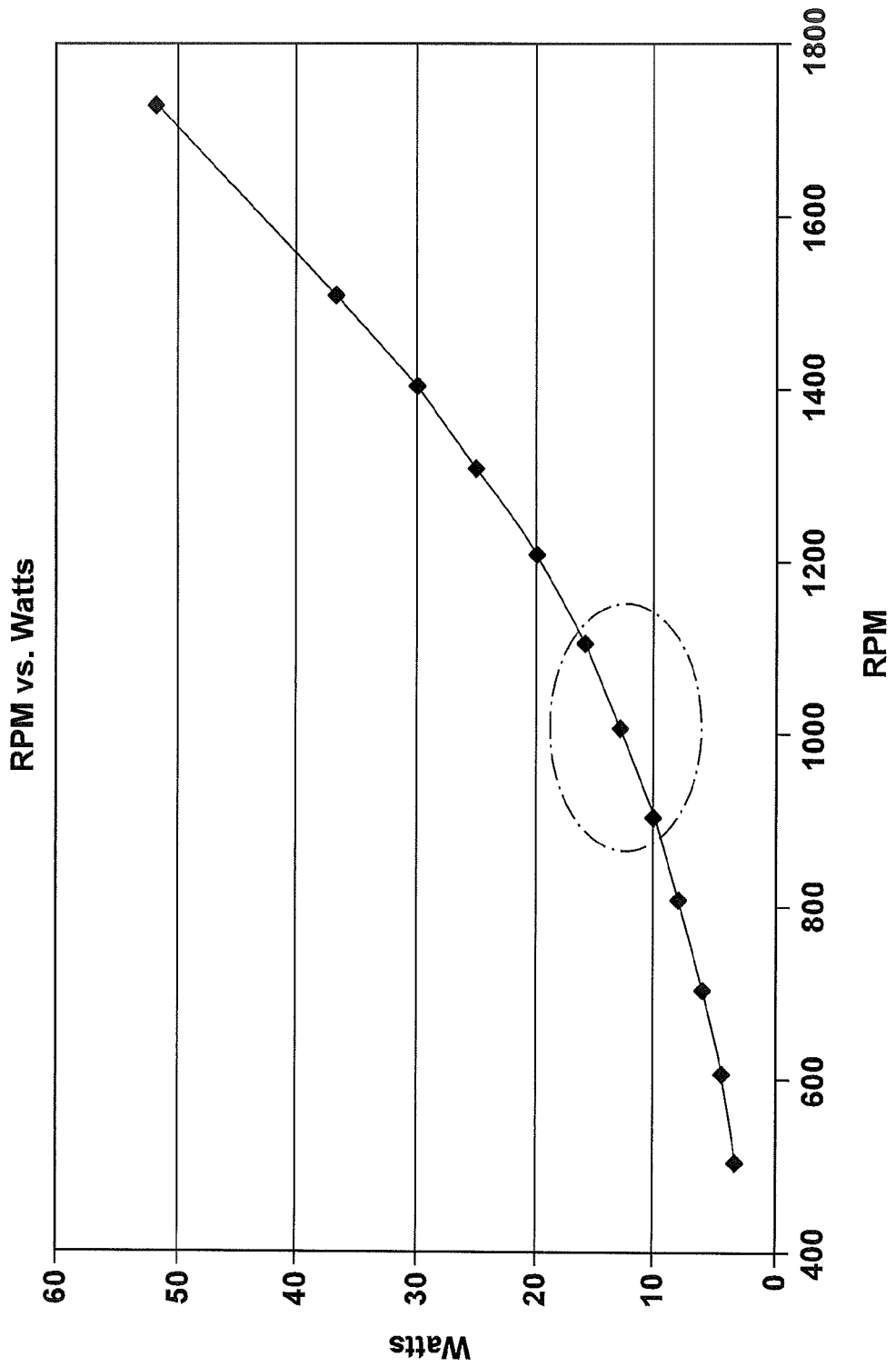
FIG. 4 is an exemplary plot of the speed of rotation of a fan motor against power consumption thereof, in a particular application.

FIG. 4 is a graph illustrating the relationship between the power consumed by an exemplary fan motor (indicated on the vertical axis, in watts) and the speed at which an exemplary fan motor of the present invention is rotating (indicated on the horizontal axis, in revolutions per minute (rpm)). As shown, the fan motor consumes variable amounts of power while it rotates at different speeds and the relationship between the power consumed and the speed is non-linear as indicated by the curve. As described above, for a particular application of the evaporator assembly of the invention, there is a minimum speed at which the fan motor preferably rotates to provide sufficient air circulation within the housing to maintain a substantially uniform air temperature inside the housing and to retard the formation of frost on surfaces inside the housing.

For example, for the application illustrated in FIG. 4, the fan motor preferably rotates at between about 900 and about 1100 rpm when the evaporator assembly of the invention is operating in circulation mode. The region in which the fan motor operates in circulation mode is generally indicated by the circled part of the curve. In the example illustrated in FIG. 4, the slope of the curve is substantially flatter within the circle as compared to the slope of the curve at higher rpms, e.g., between about 1,400 rpm and about 1,700 rpm. Preferably, the fan motor rotates at about 1,730 rpm when the evaporator assembly is in cooling mode. As shown, the fan motor consumes approximately 10 watts while rotating at approximately 900 rpm and approximately 17 watts while rotating at approximately 1,100 rpm. It is apparent from FIG. 4 that the evaporator assembly of the invention consumes significantly less energy while operating in circulation mode than when in cooling mode.

Figure 5:
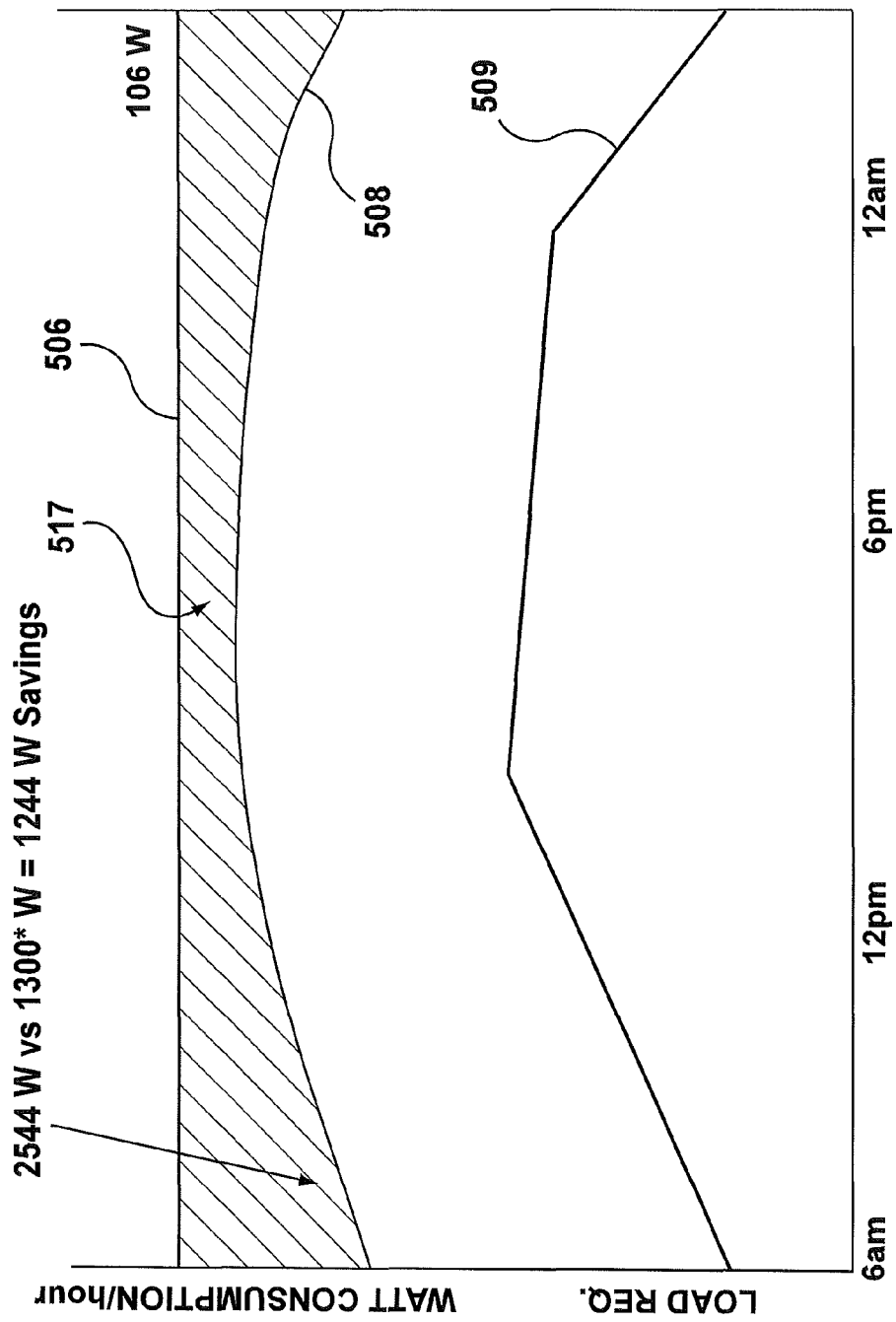
FIG. 5 is an exemplary plot providing a graphic comparison of power consumption by a fan motor with a prior art fan control circuit and a fan motor with a fan control circuit of the invention, in a particular application.

Reference is next made to FIG. 5, which illustrates the greater energy efficiency of the evaporator assembly of the invention as compared to an evaporator assembly of the prior art. In FIG. 5, the graph includes a vertical axis for indicating the power consumed in watts, and different times of the day are indicated on the horizontal axis, for an exemplary application of the evaporator assembly of the invention. The line 506 represents the power consumed by an evaporator assembly of the prior art which is operating at a constant power of approximately 106 W for the entire day. Over the 24-hour period illustrated in FIG. 5, the evaporator assembly of the prior art consumes 2544 W·hrs. The line 508 represents the power consumed by an exemplary evaporator assembly 110 of the present invention. Line 509 illustrates the minimum power that is required at each point of the day to meet the needs of the application. As shown, the power required "peaks" at mid-afternoon which is generally the warmest part of the day. It will be appreciated that the line 509 will typically be different for each day and will vary throughout the year. In the example illustrated in FIG. 5, the evaporator assembly of the invention consumes a variable amount of power throughout the day as indicated by the line 508. As shown in FIG. 5, the evaporator assembly of the invention consumes less power than the evaporator assembly of the prior art but is still able to meet the minimum power required by the application. The region identified as 517 in FIG. 5 represents the energy that is saved by employing the evaporator assembly of the present invention over the evaporator assembly of the prior art. It has been found that for the exemplary application illustrated in FIG. 5, the evaporator assembly of the present invention consumes 1244 W·hrs less energy than the evaporator assembly of the prior art.

Tests were conducted on an embodiment of a refrigeration system of the invention, to determine whether actual energy consumption would be consistent with the anticipated energy consumption. The relevant details of the test refrigeration system were as follows:

Condensing Unit Model: KESA040L6-HT4A (uses R404A 460V 4 hp Discus compressor) nominal rated at 26,000 Btuh at −20 F SST.

Evaporator Model: KLP422VE-S2A (uses four 230V 1/15 HP fan motors, R404A Nominal rating 22,000 Btuh).

EC Motor Model: 230V G.E. Arktic 59 1000/1725 rpm, 1/15 HP.

The test system was set up to provide adequate heat load in a −10 F Freezer Room to maintain a daily (24 hr) compressor run time/off time ratio of 3 to 1 (75% running to 25% not running) over a 22 hour period, and two hours were allocated to total daily (24 hr) defrosting time. Conventional temperature control methods (use of room thermostat) were used to cycle the compressor in order to maintain the −10 F room temperature.

The two methods of comparable operation were noted:
(1) Evaporator fans running full speed at all times (when compressor was either running or off) (referred to as "ECM" in FIGS. 6A and 6B), and
(2) Energy saving mode (i.e., utilizing the invention herein) when evaporator fans ran full speed (when compressor was running) and slow speed mode (when the compressor was off) (referred to as "Invention" in FIGS. 6A and 6B).

Figure 6A:
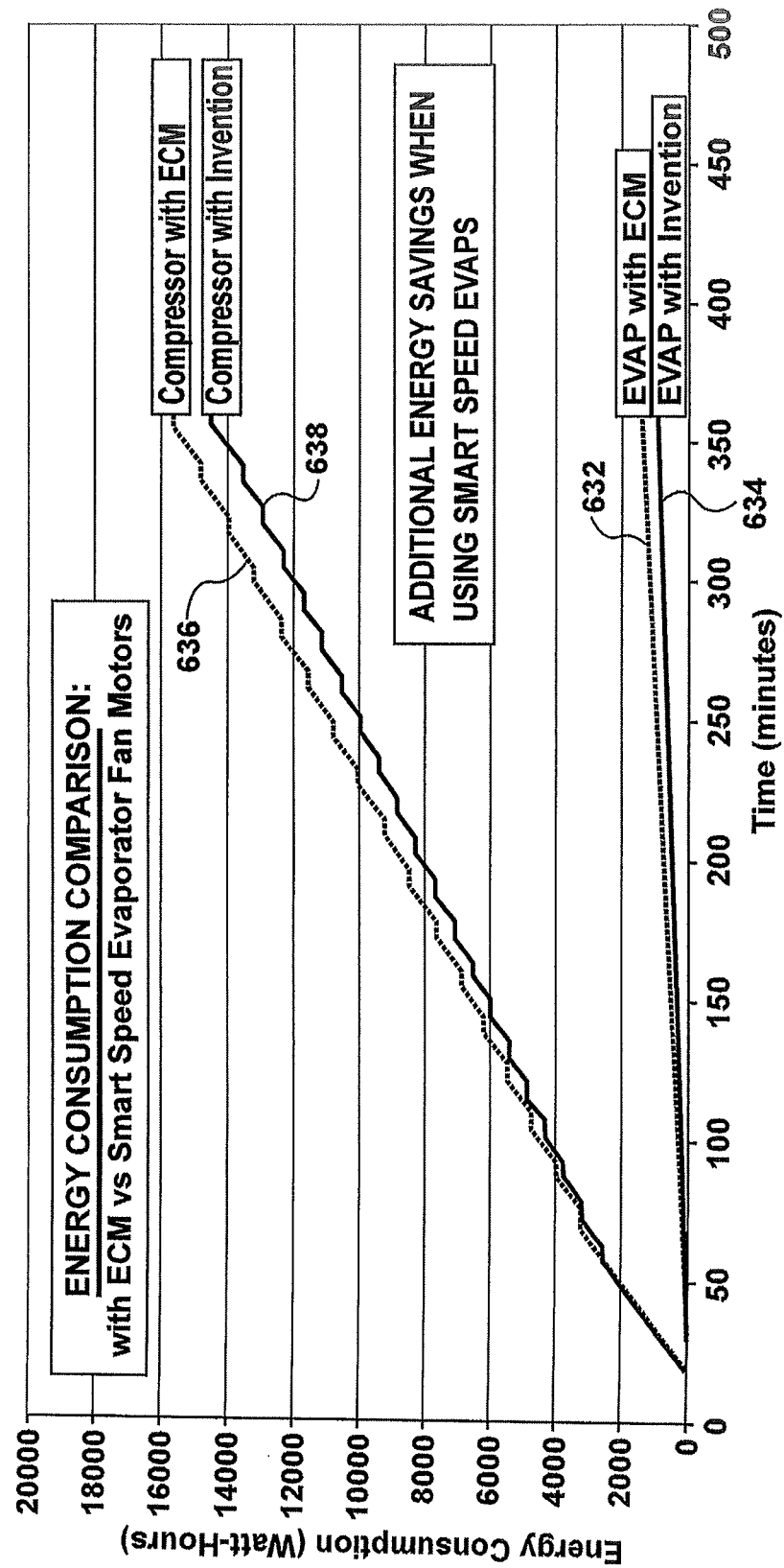
FIG. 6A is a graph showing energy consumption of fan motors and a compressor in a test of an embodiment of a refrigeration system of the invention.
Figure 6B:
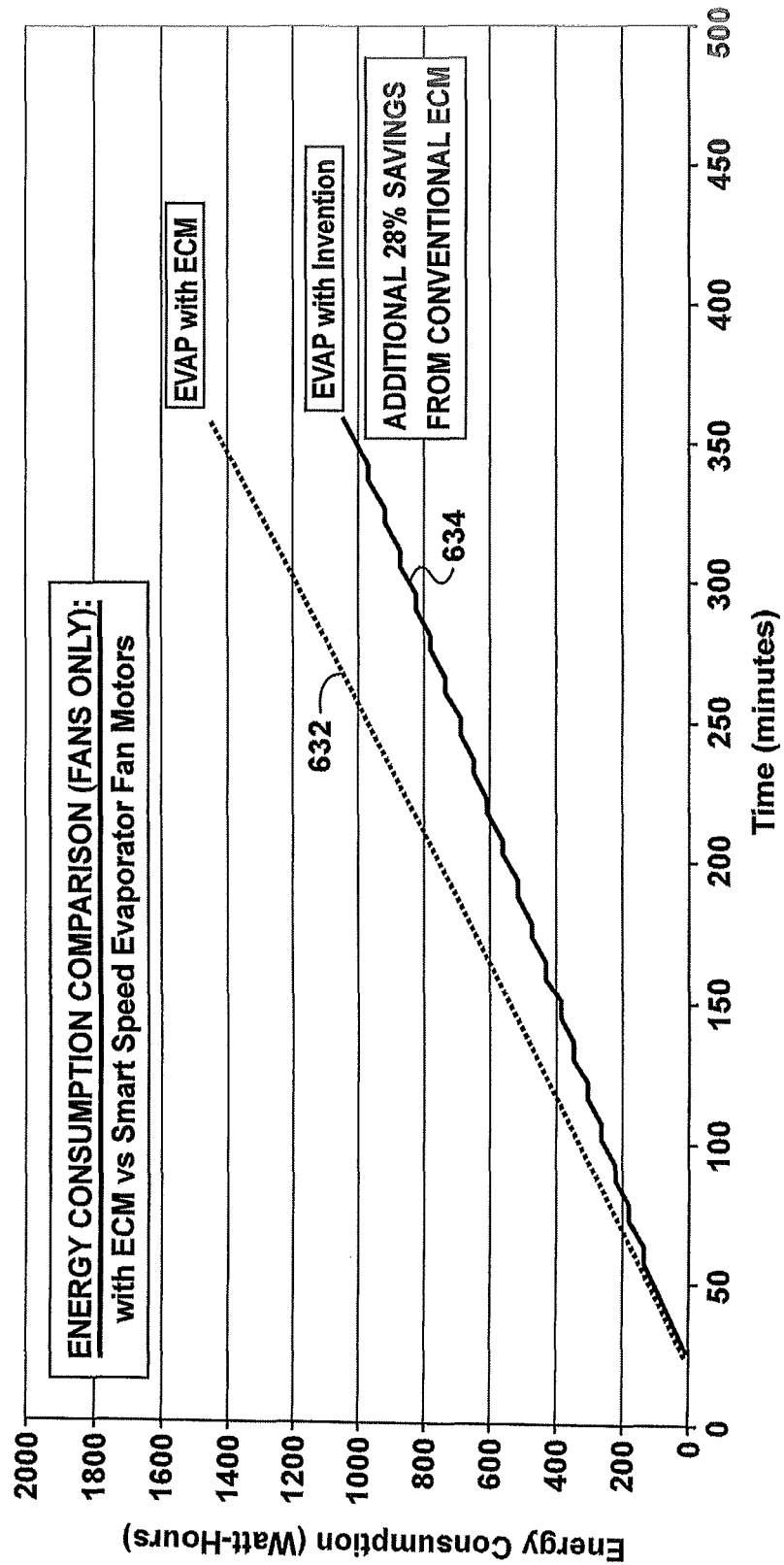
FIG. 6B is a graph showing energy consumption of the fan motors only in the test.

In FIGS. 6A and 6B, the energy consumption of the fan motors in an evaporator assembly with ECM is shown by the line identified by reference numeral 632, and the energy consumption of the fan motors in an evaporator assembly with the invention is shown by the line identified by reference numeral 634. The results of the test for the fan motors are shown more clearly in FIG. 6B, indicating that the fan motors consumed significantly less energy when the invention was utilized, i.e., approximately 28% less. However, FIG. 6A shows that, in the test system, significantly lower compressor wattages were also observed.

The energy consumption of the compressor with ECM is shown by the line identified by reference numeral 636, and the energy consumption of the compressor with the invention is shown by the line identified by reference numeral 638 (FIG. 6A). It appears that the lower compressor wattage when the invention is utilized is a consequence of the more efficient consumption of energy by the fan motors. The invention causes the fan motors to consume less energy (i.e., the invention causes the fan motors to operate more efficiently). Because the fan motors generate heat inside the housing when operating, more efficient operation of the fan motors results in less heat being added to the housing, with the result that the compressor is, in turn, required to work less. Therefore, the compressor consumes significantly less energy when the invention is utilized.

Figure 7:
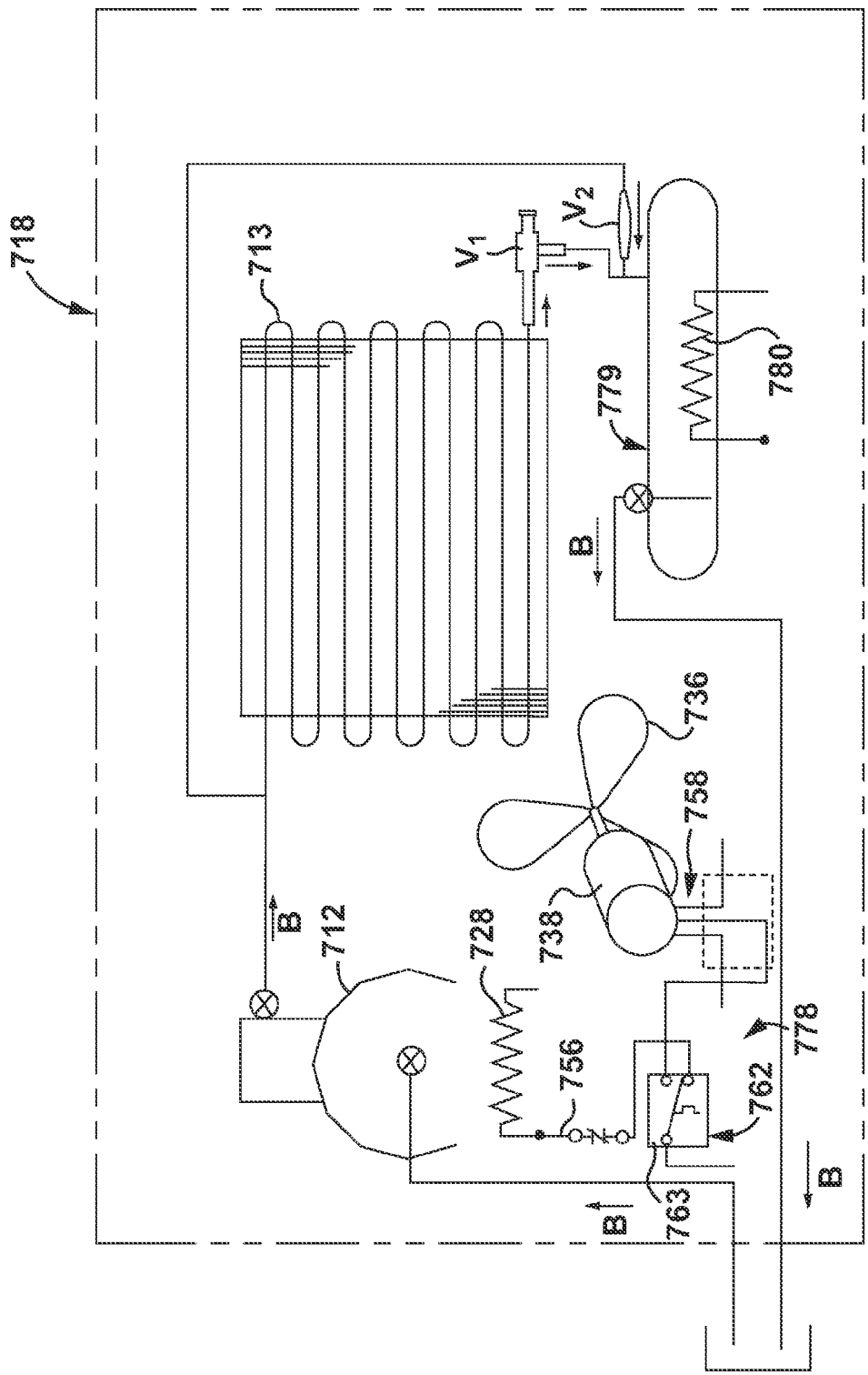
FIG. 7 is a schematic diagram illustrating an embodiment of a condenser assembly of the invention.
Figure 8:
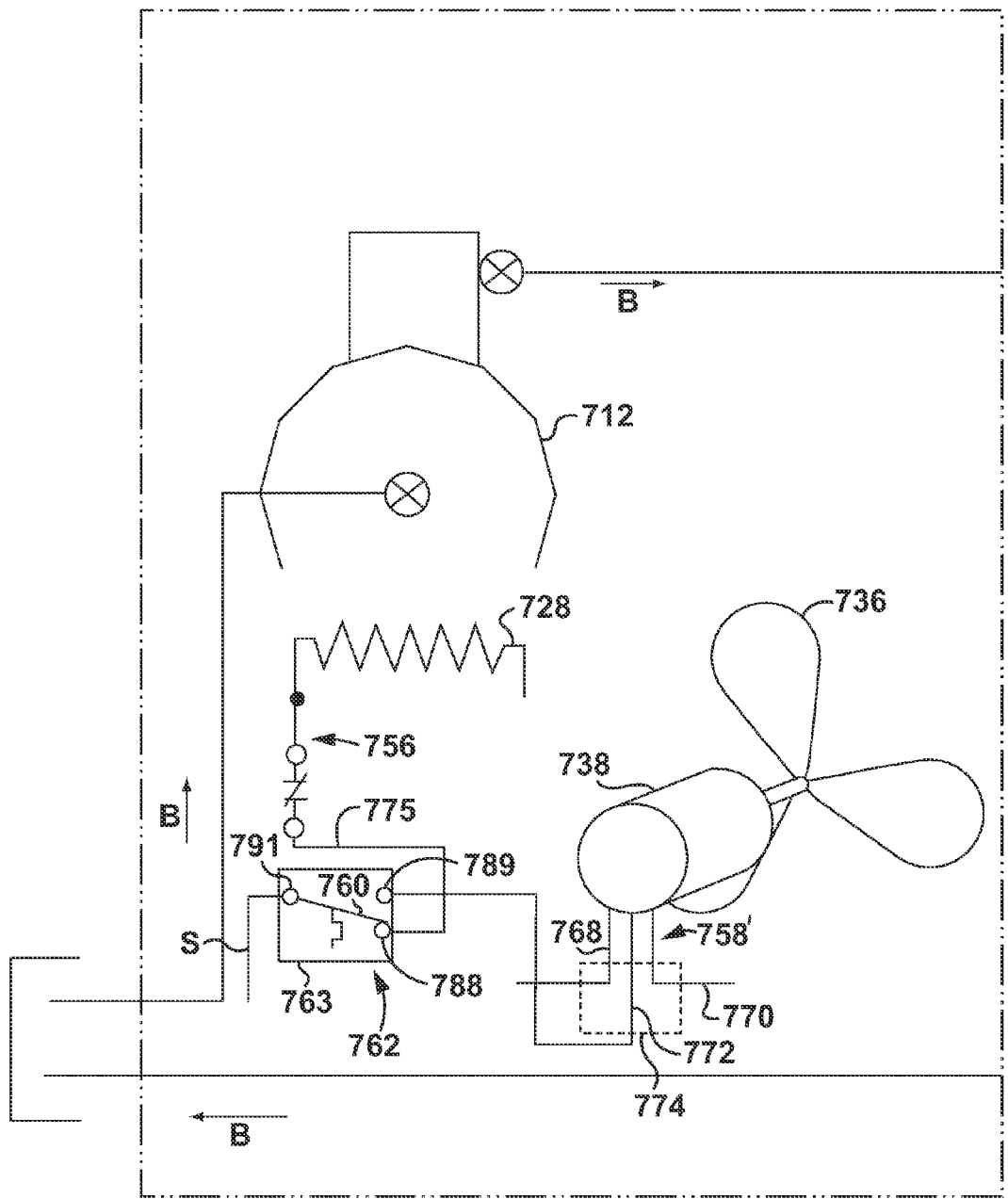
FIG. 8 is a schematic diagram illustrating an embodiment of a condenser assembly of the invention in which an embodiment of a condenser switch subassembly thereof is in a first condition.
Figure 9:
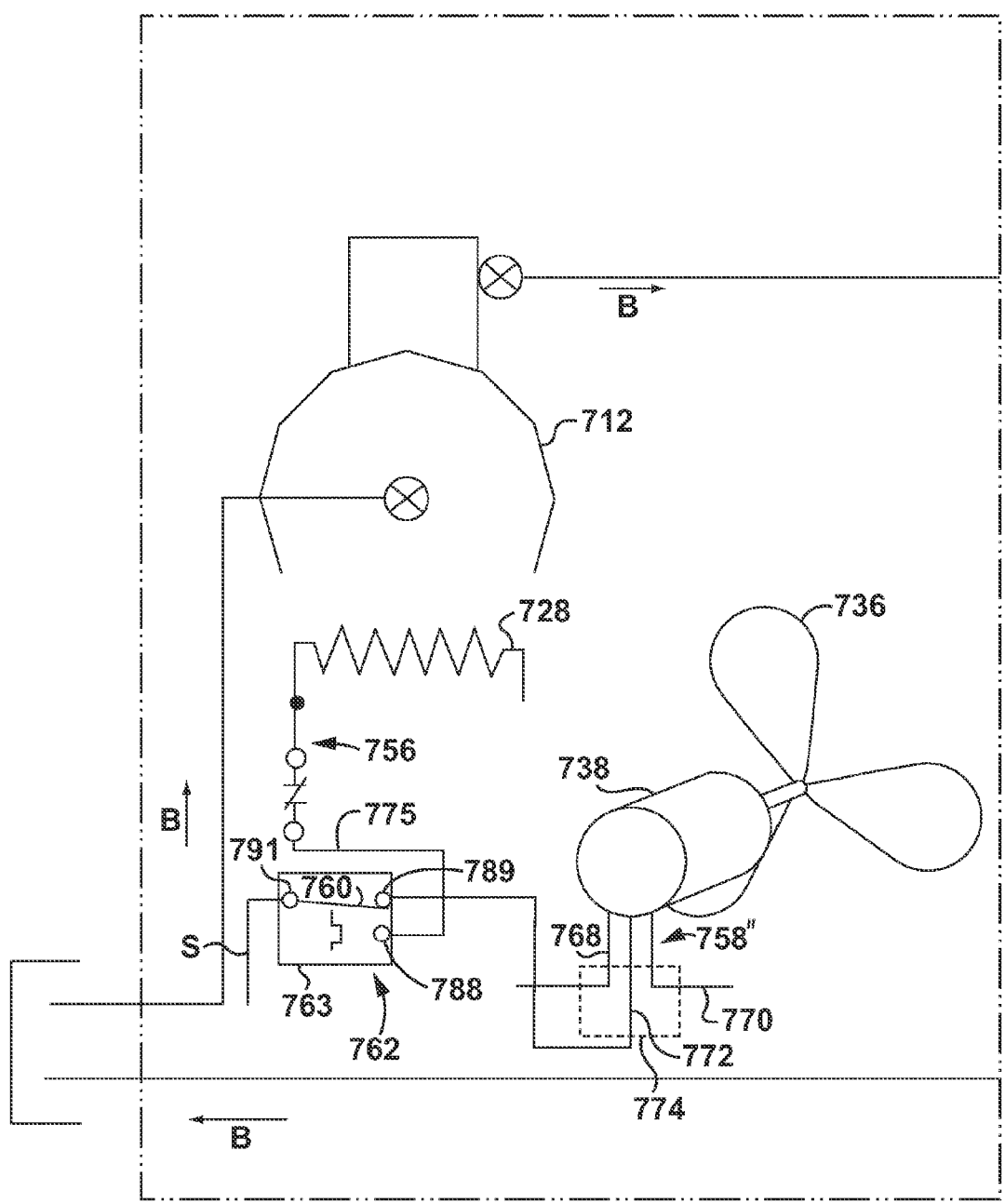
FIG. 9 is a schematic diagram of the condenser assembly of FIG. 8 in which the condenser switch subassembly thereof is in a second condition.
Figure 10:
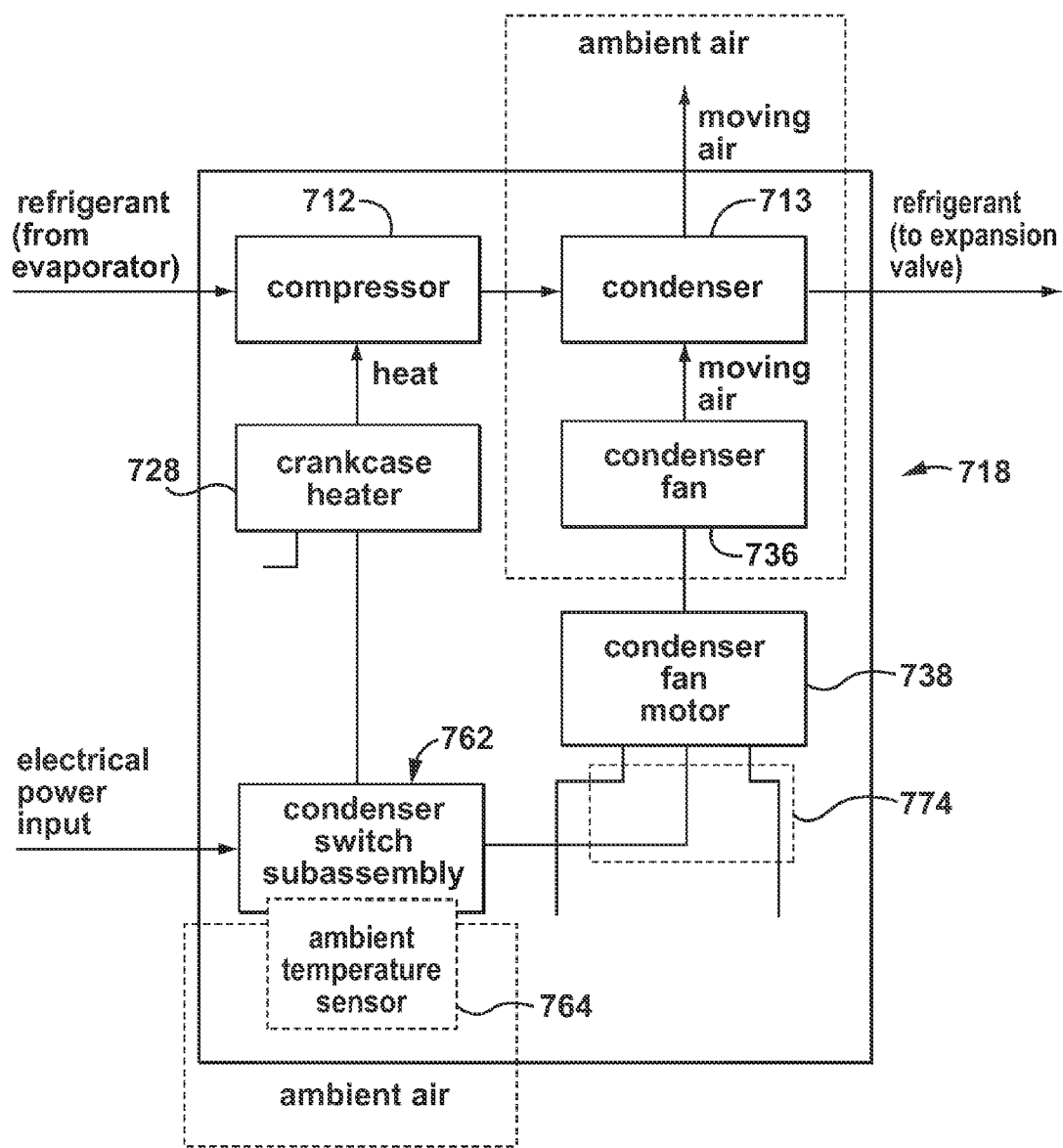
FIG. 10 is a block diagram illustrating an embodiment of the condenser assembly of the invention.

Embodiments of a condenser assembly 718 of the invention are illustrated in FIGS. 7-10. A refrigerant (not shown) is circulated through the condenser assembly 718 to transfer heat from the refrigerant to ambient air in which the condenser assembly 718 is at least partially disposed (FIGS. 7, 10). In one embodiment, the condenser assembly 718 preferably includes a compressor 712 for compressing and superheating the refrigerant, and a crankcase heater 728 for heating the compressor 712, the crankcase heater 728 being energizable via a crankcase heater control circuit 756 (FIG. 7). It is also preferred that the condenser assembly 718 includes a condenser 713 in fluid communication with the compressor 712 in which the refrigerant is received after exiting the compressor 713, and one or more condenser fans 736, for moving the ambient air past the condenser 713 to transfer heat from the refrigerant in the condenser 713 to the ambient air. Preferably, the condenser assembly 718 also includes one or more electronically commutated condenser fan motors 738 for rotating the condenser fan(s) 736, the condenser fan motor 738 being energizable via a condenser fan control circuit 758 (FIG. 7) selected from the group consisting of a first condenser fan control circuit 758' (FIG. 8) and a second condenser fan control circuit 758" (FIG. 9) that includes a third conductor 772, as will be described. It is also preferred that the condenser assembly 718 includes a condenser switch subassembly 762 configured to control energization of the crankcase heater 728 and the condenser fan motor 738. As will also be described, the condenser switch subassembly 762 preferably is switchable between a first condition (FIGS. 7, 8), in which the crankcase heater control circuit 756 is closed and energizable, and the second condenser fan control circuit 758" is open and non-energizable, and a second condition (FIG. 9), in which the crankcase heater control circuit 756 is open and non-energizable, and the second condenser fan control circuit 758" is closed and energizable. It is also preferred that the condenser assembly 718 includes an ambient temperature sensor 764 (FIG. 10) for sensing one or more temperatures of the ambient air, to provide a sensed temperature.

In one embodiment, the condenser switch subassembly 762 preferably includes a switch 763 (FIG. 7) controlled by the ambient temperature sensor 764 such that, when the sensed temperature is equal to or less than a predetermined cut-in temperature, the condenser switch subassembly 762 is in the first condition (FIGS. 7, 8), and when the sensed temperature is greater than the predetermined cut-in temperature, the condenser switch subassembly 762 is in the second condition (FIG. 9). Preferably, the condenser assembly 718 also includes a condenser fan controller 774 that is configured to detect energization of the third conductor 772, and to apply a first voltage to the condenser fan motor 738 when energization of the third conductor 772 is not detected thereby. Also, the controller 774 is configured to apply a second voltage to the condenser fan motor 738 when energization of the third conductor 772 is detected thereby. The second voltage is greater than the first voltage. It will be understood that the controller 774 is included in the electronically commutated motor 738.

It will be understood that, in use, electrical energy preferably is provided to the condenser assembly 718 by a source of electrical energy (not shown). When the condenser switch subassembly 762 is in the first condition, the crankcase heater 728 and the first condenser fan control circuit 758' are energized. Also, when the condenser switch subassembly 762 is in the second condition, the second condenser fan control circuit 758" is energized. From the foregoing it can be seen that when the crankcase heater 728 and the first condenser fan control circuit 758' are energized, the second condenser fan control circuit 758" is not, i.e., it is open, and non-energized. Conversely, when the crankcase heater 728 is open and non-energized, the second condenser fan control circuit 758" is closed, and energized. In one embodiment, the conductors 768, 770 preferably remain electrically connected to the condenser fan motor 738, and the controller 774 causes the voltage applied to the motor 738 to be either the (lower) first voltage or the (higher) second voltage depending on whether the controller detects that the third wire 772 is energized. It will also be understood that the control circuits are only partially illustrated, to simplify the drawings.

In one embodiment, it is preferred that the first and second voltages, when detected respectively, are each greater than zero so that the condenser fan motor 738 operates when the sensed temperature is below the cut-in temperature.

As can be seen in FIGS. 7-9, the crankcase heater control circuit 756 preferably includes a first conductor 775.

Those skilled in the art would appreciate that the switch 763 in the condenser switch subassembly 762 may be any suitable switch, e.g., mechanical or electronic. Preferably, the switch 763 is a single pole double throw switch. The switch 763 preferably includes a contact 760 in the switch that is electrically connectable to the first conductor 775 of the crankcase heater control circuit 756 at a first contact point 788 (i.e., to close the crankcase heater control circuit 756, and to open the second condenser fan control circuit 758"') and, alternatively, electrically connectable to the third conductor 772 at a second contact point 789 (i.e., to open the crankcase heater control circuit 756 and to close the second condenser fan circuit 758"'). The switch 763 preferably also includes a third contact point 791 with which the contact 760 is electrically connected, and the third contact point 791 is in turn electrically connected to a supply wire "S" through which electricity is provided from the source of electrical energy.

Those skilled in the art would also appreciate that the ambient temperature sensor 764 may be any suitable temperature sensor. For instance, in one embodiment (as schematically illustrated in FIGS. 7-9), the ambient temperature sensor 764 preferably is built into the switch 763. For example, the ambient temperature sensor 764 may be a bimetallic strip that expands and contracts appropriately in response to changes in the sensed ambient air temperature, so that such physical changes in the bimetallic strip cause the strip to urge the contact 760 to move between engagement with the first contact 788 and the second contact 789 when the sensed temperature is below, equal to, or above the predetermined cut-in temperature, as the case may be. Those skilled in the art would appreciate that, in this embodiment, the ambient temperature sensor 764 preferably is at least partially positioned in the condenser switch subassembly 762, and is also at least partially exposed to or immersed in the ambient air.

From the foregoing, it can be seen that, upon the sensed ambient temperature being determined to be below the cut-in temperature, the conductor 760 is electrically connected with the first contact 788, to close the crankcase heater control circuit 756 (FIGS. 7, 8). In this configuration, energy provided via the supply wire "S" is supplied to the crankcase heater 728 via the crankcase heater control circuit 756. Also, in this arrangement, the second condenser fan control circuit 758" is open. The controller 774 therefore detects no current through the third wire 772. Accordingly, the first voltage is applied across the conductors 768, 770, i.e., the first voltage is provided to the condenser fan motor 738 across the conductors 768, 770. Because the first voltage is lower than the second voltage, the condenser fan's speed of rotation is slower when the second condenser fan control circuit 758" is open than when the second condenser fan control circuit 758" is closed.

When the sensed temperature is above the cut-in temperature, the conductor 760 is electrically connected with the second contact 789, the third wire 772 is electrically energized (FIG. 9). In this arrangement, the controller 774 detects that the third wire 772 is energized, and accordingly the controller 774 applies the second voltage to the condenser fan motor 738. The fan 736 rotates more quickly because the second voltage is greater than the first voltage.

In this way, the condenser assembly 718 of the invention provides for its relatively efficient operation. In colder weather (i.e., when the ambient temperature is below the cut-in temperature), the crankcase heater 728 is energized, thereby providing for efficient operation of the compressor 712 at colder temperatures, and the condenser fan 736 is rotated at a lower speed, because less ambient air flow over the condenser is needed for efficient operation of the condenser 713 at colder temperatures. When the temperature of the ambient air is above the cut-in temperature, the crankcase heater 728 is not energized (i.e., because it is not needed for efficient operation of the compressor 712), and the condenser fan 736 is rotated at a higher speed, in order to provide movement of the ambient air over the condenser at a higher rate, for more cooling of the refrigerant flowing through the condenser.

Figure 11:
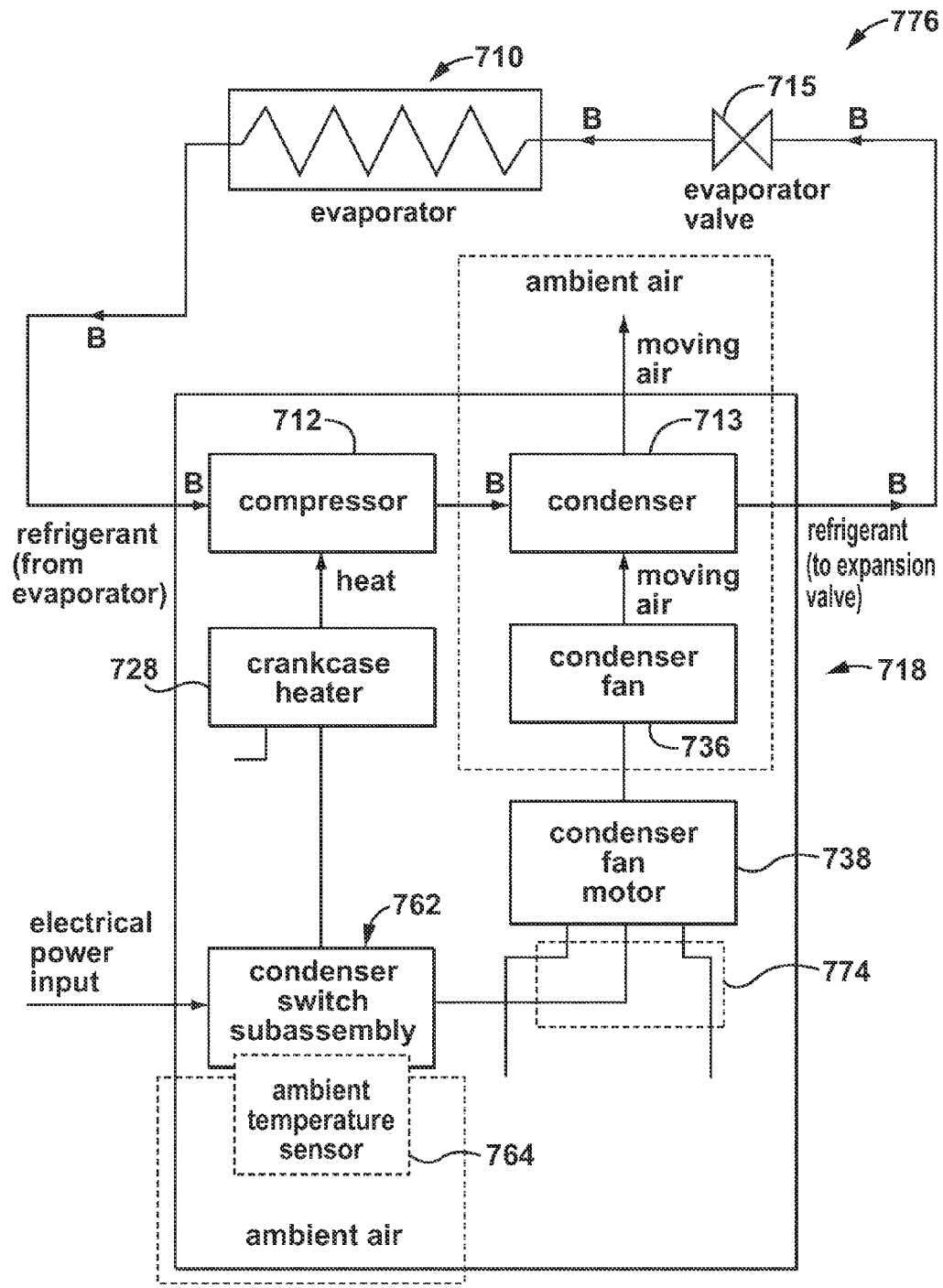
FIG. 11 is a block diagram illustrating another embodiment of the refrigeration system of the invention.

As can be seen in FIG. 11, an embodiment of a refrigeration system 776 in which the refrigerant is circulatable to transfer heat out of a volume of air in a housing (not shown) preferably includes an evaporator assembly 710 through which the refrigerant is circulatable, the evaporator assembly 710 including an evaporator 726 through which the refrigerant is directed, for heat transfer from the air in the housing (not shown in FIGS. 7-11) to the refrigerant. The refrigeration system 776 preferably also includes the condenser assembly 718, as can also be seen in FIG. 11. It is also preferred that the refrigeration system 776 also includes an expansion valve 715 located between the condenser and the evaporator through which the refrigerant flows, as is known in the art. It will be understood that a number of elements of the refrigeration system 776 (e.g., an evaporator fan) are omitted from FIG. 11 for clarity. The flow of refrigerant through the condenser assembly 718, the expansion valve 715, the evaporator 726, and back to the condenser assembly 718 is indicated by arrows "B" in FIGS. 7-11.

Those skilled in the art would appreciate that the condenser subsystem of the prior art (i.e., in a refrigeration system of the prior art) may be converted into the condenser assembly 718 relatively easily. A kit of parts 778 preferably includes the condenser switch subassembly 762 configured to control energization of the crankcase heater 728 and the condenser fan motor 738, the condenser switch subassembly 762 preferably including the single pole double throw switch 763. Preferably, the kit of parts 778 also includes the ambient temperature sensor 764 for sensing the temperature of the ambient air. As described above, the ambient temperature sensor 764 preferably is configured to cause the condenser switch subassembly 762, upon the sensed temperature being approximately equal to or less than the cut-in temperature, to be in the first condition. Also, upon the sensed temperature being greater than the cut-in temperature, the ambient sensor 764 causes the condenser switch subassembly 762 to be in the second condition. Preferably, the kit of parts 778 also includes the third wire 772, for connection to the fan controller 774 and the condenser switch subassembly 762. It is also preferred that the kit of parts 778 includes the condenser fan controller 774 configured: to detect whether the third wire 772 is energized; to apply the first voltage to the condenser fan motor 738 when the third wire is not energized; and to apply the second voltage to the condenser fan motor 738 when the third wire 772 is energized.

In use, the refrigerant is circulated through the condenser assembly 718 to transfer heat from the refrigerant to ambient air in which the condenser assembly 718 is at least partially disposed. The method of the invention preferably includes compressing the refrigerant in the compressor 712, providing the crankcase heater 728 to heat the compressor 712, and providing the condenser 713 that is in fluid communication with the compressor 712, in which the refrigerant exiting the compressor is received. The condenser fan 736 is also provided, for moving the ambient air past the condenser 712 to transfer heat from the refrigerant in the condenser 712 to the ambient air, and the electronically commutated condenser fan motor 738 is also provided, for rotating the condenser fan 736. The condenser switch subassembly 762 is also provided, to control energization of the crankcase heater 728 and the condenser fan motor 738, as described above. In addition, the ambient temperature sensor 764 is provided, for sensing the temperature of the ambient air, to determine the sensed temperature and to cause the condenser switch subassembly to be in the first or second condition accordingly, in view of the cut-in temperature. As described above, it is preferred that the condenser switch subassembly 762 is configured to be in the first condition when the sensed temperature is at or below the predetermined cut-in temperature, and the condenser switch subassembly 762 is configured to be in the second condition when the sensed temperature is greater than the predetermined cut-in temperature. First and second conductors 768, 770 are included in the first condenser fan circuit 758' that are electrically connected to the condenser fan motor 738 that, when energized, provide a first drive voltage to the condenser fan motor 738. Also, the first conductor 768 and the third conductor 772 are included in the second condenser fan circuit 758" that are electrically connected to the condenser fan motor 738 and, when energized, provide a second drive voltage to the condenser fan motor 738 that is greater than the first drive voltage. In addition, the condenser fan controller 774 is provided to detect energization of the third wire 772. When the controller 774 detects that the third wire 772 is energized, the controller applies the (higher) second voltage to the condenser fan motor 738. If the third wire 772 is not energized, then the controller 774 applies the (lower) first voltage to the condenser fan motor 738. Electrical energy is provided to the condenser switch assembly 718 so that, when the condenser switch subassembly 762 is in the first condition, the crankcase heater control circuit 756 and the first condenser fan control circuit 758' are energized, and when the condenser switch subassembly 762 is in the second condition, the second condenser fan control circuit 758" is energized. Also, when the second condenser fan control circuit 758" is energized, the crankcase heater control circuit 756 is open, and therefore not energized.

In one embodiment, the condenser assembly 718 preferably also includes a liquid reservoir tank 779 (FIG. 7). As is known, the reservoir tank 779 provides temporary storage for refrigerant from the condenser 713. The refrigerant exiting the condenser 713 is accumulatable in the reservoir tank 779. The flow of the refrigerant into the reservoir tank 779 preferably is controlled by an inlet pressure regulator valve "$V_1$" and by a bypass valve "$V_2$", as is known.

In one embodiment, the condenser assembly preferably also includes a reservoir heater 780 at least partially positioned in the reservoir tank 779. As will be described, it is also preferred that the reservoir heater 780 is electrically connected with the crankcase heater 728 so that the reservoir heater 780 is electrically energized when the crankcase heater 728 is energized.

Those skilled in the art would appreciate that, when the ambient air temperature is relatively cold, providing heat to the substantially liquid refrigerant in the reservoir tank 779 enables the condenser assembly 718 to operate with a reasonable degree of efficiency. As noted above, the reservoir heater 780 preferably is electrically connected so that the reservoir heater 780 is electrically energized when the crankcase heater 728 is energized. As described above, the crankcase heater 728 is energized when the ambient air temperature is at or below the predetermined cut-in temperature, i.e., when the condenser switch subassembly 762 is in the first condition. It will be understood that the reservoir heater 780 and the crankcase heater 728 preferably are electrically connected in any suitable manner, directly or indirectly, and that the connection of the reservoir heater 780 and the crankcase heater 728 is omitted from FIG. 7 to simplify the drawings.

It will also be appreciated by those skilled in the art that the invention can take many forms, and that such forms are within the scope of the invention as described above. The foregoing descriptions are exemplary, and their scope should not be limited to the preferred versions provided herein.

We claim:

1. A condenser assembly through which a refrigerant is circulated to transfer heat from the refrigerant to ambient air in which the condenser assembly is at least partially disposed, the condenser assembly comprising:
   a compressor, for compressing and superheating the refrigerant;
   a crankcase heater for heating the compressor, the crankcase heater being energizable via a crankcase heater control circuit;
   a condenser in fluid communication with the compressor in which the refrigerant is received after exiting the compressor;
   at least one condenser fan, for moving the ambient air past the condenser to transfer heat from the refrigerant in the condenser to the ambient air;
   at least one electronically commutated condenser fan motor for rotating said at least one condenser fan, said at least one condenser fan motor being energizable via a condenser fan control circuit selected from the group consisting of a first condenser fan control circuit comprising first and second conductors and a second condenser fan control circuit comprising a third conductor;
   a condenser switch subassembly configured to control energization of the crankcase heater and said at least one condenser fan motor, the condenser switch subassembly being switchable between:
     a first condition, in which the crankcase heater control circuit is closed and energizable, and the second condenser fan control circuit is open and non-energizable, and
     a second condition, in which the crankcase heater control circuit is open and non-energizable, and the second condenser fan control circuit is closed and energizable;
   an ambient temperature sensor for sensing at least one temperature of the ambient air, to provide a sensed temperature;
   the condenser switch subassembly comprising a single pole double throw switch controlled by the ambient temperature sensor such that, when the sensed temperature is equal to or less than a predetermined cut-in temperature, the condenser switch subassembly is in the first condition, and when the sensed temperature is greater than the predetermined cut-in temperature, the condenser switch subassembly is in the second condition; and
   a condenser fan controller configured to detect energization of the third conductor, to apply a first voltage to the condenser fan motor when energization of the third conductor is not detected thereby, and to apply a second voltage to the condenser fan motor when the third conductor is energized, the second voltage being greater than the first voltage.

2. The condenser assembly according to claim 1 in which the first and second voltages, when detected respectively, are each greater than zero such that said at least one condenser fan motor operates when the sensed temperature is below the cut-in temperature.

3. The condenser assembly according to claim 1 additionally comprises a reservoir tank in which the refrigerant exiting the condenser is accumulatable.

4. The condenser assembly according to claim 3 additionally comprises a reservoir heater for heating the refrigerant in the reservoir tank, the reservoir heater being electrically connected with the crankcase heater such that the reservoir heater is electrically energized when the crankcase heater is electrically energized.

5. A refrigeration system in which a refrigerant is circulatable to transfer heat out of a volume of air in a housing, the refrigeration system comprising:
   an evaporator assembly through which the refrigerant is circulatable for heat transfer from the air in the housing to the refrigerant, the evaporator assembly comprising an evaporator through which the refrigerant is directed, for heat transfer from the air to the refrigerant;
   a condenser assembly through which the refrigerant is circulatable for heat transfer from the refrigerant to ambient air in which the condenser assembly is at least partially disposed, the condenser assembly comprising:
      a compressor through which the refrigerant received from the evaporator is circulatable, for compressing and superheating the refrigerant;
      a crankcase heater for heating the compressor, the crankcase heater being energizable via a crankcase heater control circuit;
      a condenser in fluid communication with the compressor in which the refrigerant is received after exiting the compressor;
      at least one condenser fan, for moving the ambient air past the condenser to transfer heat from the refrigerant in the condenser to the ambient air;
      at least one electronically commutated condenser fan motor for rotating said at least one condenser fan, said at least one condenser fan motor being energizable via a condenser fan control circuit selected from the group consisting of a first condenser fan control circuit comprising first and second conductors and a second condenser fan control circuit comprising a third conductor;
      a condenser switch subassembly configured to control energization of the crankcase heater and said at least one condenser fan motor, the condenser switch subassembly being switchable between:
         a first condition, in which the crankcase heater control circuit is closed, and the second condenser fan control circuit is open, and
         a second condition, in which the crankcase heater control circuit is open, and the second condenser fan control circuit is closed;
      an ambient temperature sensor for sensing at least one temperature of the ambient air, to provide a sensed temperature;
      the condenser switch subassembly comprising a single pole double throw switch controlled by the ambient temperature sensor such that, when the sensed temperature is equal to or less than a predetermined cut-in temperature, the condenser switch subassembly is in the first condition, and when the sensed temperature is greater than the predetermined cut-in temperature, the condenser switch subassembly is in the second condition; and
      a condenser fan controller configured to detect energization of the third conductor, to apply a first voltage to the condenser fan motor when energization of the third conductor is not detected thereby, and to apply a second voltage to the condenser fan motor when the third conductor is energized, the second voltage being greater than the first voltage.

6. The refrigeration system according to claim 5 in which the first and second voltages, when detected respectively, are each greater than zero such that said at least one condenser fan motor is operates when the sensed temperature is below the cut-in temperature.

7. The refrigeration system according to claim 5 additionally comprises a reservoir tank in which the refrigerant exiting the condenser is accumulatable.

8. The refrigeration system according to claim 7 additionally comprises a reservoir heater for heating the refrigerant in the reservoir tank, the reservoir heater being electrically connected with the crankcase heater such that the reservoir heater is electrically energized when the crankcase heater is electrically energized.

9. A kit of parts for modifying a refrigeration system to provide a modified evaporator assembly, a refrigerant circulated therethrough into which heat is transferred from air in a housing, the refrigeration system comprising:
   an evaporator assembly for heat transfer from the air in the housing to the refrigerant;
   a condenser assembly through which the refrigerant is circulatable for heat transfer from the refrigerant to ambient air in which the condenser assembly is at least partially disposed, the condenser assembly comprising:
      a compressor through which the refrigerant received from the evaporator is circulatable, for compressing and superheating the refrigerant;
      a crankcase heater for heating the compressor, the crankcase heater being energizable via a crankcase heater control circuit;
      a condenser in fluid communication with the compressor in which the refrigerant is received after exiting the compressor;
      at least one condenser fan, for moving the ambient air past the condenser to transfer heat from the refrigerant in the condenser to the ambient air;
      at least one electronically commutated condenser fan motor for rotating said at least one condenser fan;
   the kit of parts comprising:
      a condenser switch subassembly configured to control energization of the crankcase heater and said at least one condenser fan motor, the condenser switch subassembly being switchable between:
         a first condition, in which the crankcase heater control circuit is closed, and a second condenser fan control circuit is open, and
         a second condition, in which the crankcase heater control circuit is open, and the second condenser fan control circuit is closed;
      an ambient temperature sensor for sensing at least one temperature of the ambient air, to provide a sensed temperature;
      the condenser switch subassembly comprising a single pole double throw switch controlled by the ambient temperature sensor such that, when the sensed temperature is equal to or less than a predetermined cut-in temperature, the condenser switch subassembly is in the first condition, and when the sensed temperature is greater than the predetermined cut-in temperature, the condenser switch subassembly is in the second condition;
      the first condenser fan control circuit comprising first and second conductors electrically connected to said at least one condenser fan motor that, when energized, provide a first drive voltage to said at least one condenser fan motor;
      the second condenser fan control circuit comprising a third conductor; and
      a condenser fan controller configured to detect energization of the third conductor, to apply a first voltage to the condenser fan motor when energization of the third conductor is not detected thereby, and to apply a second voltage to the condenser fan motor when the third conductor is energized, the second voltage being greater than the first voltage.

10. The kit of parts according to claim 9 additionally comprises a reservoir tank in which the refrigerant exiting the condenser is accumulatable.

11. The kit of parts according to claim 10 additionally comprises a reservoir heater for heating the refrigerant in the reservoir tank, the reservoir heater being electrically connected with the crankcase heater such that the reservoir heater is electrically energized when the crankcase heater is electrically energized.

12. A method of operating a condenser assembly through which a refrigerant is circulatable to transfer heat from the refrigerant to ambient air in which the condenser assembly is at least partially disposed, the method comprising:
   (a) compressing the refrigerant in a compressor through which the refrigerant is circulatable;
   (b) providing a crankcase heater to heat the compressor, the crankcase heater being energizable via a crankcase heater control circuit;
   (c) providing a condenser in fluid communication with the compressor, in which the refrigerant exiting the compressor is received;
   (d) providing at least one condenser fan, for moving the ambient air past the condenser to transfer heat from the refrigerant in the condenser to the ambient air;
   (e) providing at least one electronically commutated condenser fan motor for rotating said at least one condenser fan, said at least one condenser fan motor being energizable via a condenser fan control circuit selected from the group consisting of a first condenser fan control circuit comprising first and second conductors and a second condenser fan control circuit comprising a third conductor;
   (f) providing a condenser switch subassembly configured to control energization of the crankcase heater and said at least one condenser fan motor, the condenser switch subassembly being switchable between:
      a first condition, in which the crankcase heater control circuit is closed, and the second condenser fan control circuit is open, and
      a second condition, in which the crankcase heater control circuit is open, and the second condenser fan control circuit is closed;
   (g) providing an ambient temperature sensor for sensing at least one temperature of the ambient air, to provide a sensed temperature;
   (h) including a single pole double throw switch in the condenser switch subassembly that is controlled by the ambient temperature sensor such that, when the sensed temperature is equal to or less than a predetermined cut-in temperature, the condenser switch subassembly is in the first condition, and when the sensed temperature is greater than the predetermined cut-in temperature, the condenser switch subassembly is in the second condition;
   (i) providing a condenser fan controller configured to detect energization of the third conductor, to apply a first voltage to the condenser fan motor when energization of the third conductor is not detected thereby, and to apply a second voltage to the condenser fan motor when the third conductor is energized, the second voltage being greater than the first voltage; and
   (j) providing electrical energy to the condenser assembly such that, when the condenser switch subassembly is in the first condition, the crankcase heater control circuit is energized and the condenser fan controller applies the first voltage to the condenser fan motor, and when the condenser switch subassembly is in the second condition, the third conductor is energized and the condenser fan controller applies the second voltage to the condenser fan motor.

\* \* \* \* \*